United States Patent [19]

Palansky et al.

[11] Patent Number: 5,521,818
[45] Date of Patent: May 28, 1996

[54] SHIFT SOLENOID FUNCTIONAL TEST STRATEGY FOR AN AUTOMATIC TRANSMISSION CONTROL SYSTEM HAVING ELECTRONIC SHIFT CONTROLLERS

[75] Inventors: Bruce J. Palansky, Livonia; Pamela J. Eggers, Milan; Richard R. Hathaway, Plymouth; Earl R. Hoffman, Wixom, all of Mich.

[73] Assignee: Ford Motor Company, Dearborn, Mich.

[21] Appl. No.: 181,144

[22] Filed: Jan. 12, 1994

[51] Int. Cl.⁶ .......................... F16H 61/12; F16H 59/68
[52] U.S. Cl. .................. 364/424.1; 364/424.01; 477/155; 477/115; 477/138; 477/906; 192/3.31; 192/109 F; 74/335; 74/336 R
[58] Field of Search ............... 364/424.1, 424.01, 364/424.03; 477/155, 63, 65, 121, 154, 155, 129, 131, 143, 97, 150, 138, 906, 130, 115, 162, 158, 163; 192/3.31, 87.17, 3.3, 3.29; 475/285, 123, 60, 128; 74/335, 336 R, 473 R

[56] References Cited

U.S. PATENT DOCUMENTS

| | | |
|---|---|---|
| 4,261,450 | 4/1981 | Matsushima et al. ............ 192/12 C |
| 4,567,791 | 2/1986 | Sato ........................... 477/906 |
| 4,953,091 | 8/1990 | Baltusis et al. ............... 364/424.1 |
| 4,955,258 | 9/1990 | Ito et al. ..................... 364/424.1 |
| 5,016,174 | 5/1991 | Ito et al. ..................... 364/424.1 |
| 5,081,886 | 1/1992 | Person et al. ................. 477/131 |
| 5,083,481 | 1/1992 | Smith et al. .................. 477/162 |
| 5,121,820 | 6/1992 | Brown et al. .................. 192/3.3 |
| 5,150,297 | 9/1992 | Daubenmier et al. .......... 364/424.1 |
| 5,157,608 | 10/1992 | Sankpal et al. ............... 364/424.1 |
| 5,167,311 | 12/1992 | Satoh et al .................. 364/424.1 |
| 5,305,663 | 4/1994 | Leonard et al. ............... 475/123 |

Primary Examiner—Kevin J. Teska
Assistant Examiner—Jacques H. Louis-Jacques
Attorney, Agent, or Firm—Frank G. McKenzie; Roger L. May

[57] ABSTRACT

A diagnostic strategy for an automatic transmission having electronic shift control solenoids for controlling application and release of clutches and brakes during the establishment and disestablishment of torque ratios in multiple-ratio gearing for the transmission wherein provision is made for developing diagnostic data that detects failure modes due to a faulty shift solenoid by using predetermined failure modes stored in the RAM portion of a microprocessor and comparing those known failure modes to the actual performance of the shift solenoids.

8 Claims, 21 Drawing Sheets

| Gear | Cl1 | Cl2 | Cl3 | Cl4 | B1 | B2 | Drive | | Coast | |
|---|---|---|---|---|---|---|---|---|---|---|
| | | | | | | | OWC 1 | OWC 2 | OWC 1 | OWC 2 |
| 1M | X | | X | | | X | X | | | X |
| 1D | X | | | | | X | X | | O/R | |
| 2 | X | X | | | | X | O/R | | O/R | |
| 3 | | X | X | | | | | X | X | |
| 4 | | X | X | X | | | | O/R | | O/R |
| R | X | | | X | | | X | | | X |

| PRNDL | OD CANCEL | GEAR | ENGINE BRAKING | SS1 | SS2 | SS3 |
|---|---|---|---|---|---|---|
| OD | OFF | 1 | NO | OFF | ON | OFF |
|  | OFF | 2 | YES | ON | ON | OFF |
|  | OFF | 3 | NO | OFF | OFF | ON |
|  | OFF | 4 | YES | ON | OFF | ON |
| 'D' | ON | 1 | NO | OFF | ON | OFF |
|  | ON | 2 | YES | ON | ON | OFF |
|  | ON | 3 | YES | OFF | OFF | OFF |
|  |  | 4 | NOT ALLOWED BY STRATEGY | | | |
| 1 |  | 1 | YES | OFF | ON | — |
|  |  | 2 | YES | OFF | OFF | — |
|  |  | 3 | NOT ALLOWED BY HYDRAULICS | | | |
|  |  | 4 | NOT ALLOWED BY HYDRAULICS | | | |
| R |  | R | NO | — | — | OFF |

| gear_actual | actual gear |
|---|---|
| 00 | 1st |
| 01 | 2nd |
| 10 | 3rd |
| 11 | 4th |

FIG. 8

| GRV_STATE (bits) | Information |
|---|---|
| b7b6 | Actual Gear when 4th was monitored |
| b5b4 | Actual Gear when 3rd was monitored |
| b3b2 | Actual Gear when 2nd was monitored |
| b1b0 | Actual Gear when 1st was monitored |

FIG. 9

| TRANSMISSION OF FIG. 1 | | | | |
|---|---|---|---|---|
| GEAR | SS3 | SS2 | SS1 | 2 Bit Rep |
| 1 | 0 | 1 | 0 | 00 |
| 2 | 0 | 1 | 1 | 01 |
| 3 | 1* | 0 | 0 | 10 |
| 4 | 1 | 0 | 1 | 11 |
| *SS3 is ON in OD & OFF in D | | | | |

No fault -> GRV_STATE = 11 10 01 00 = 228

FIG. 10

| SS1 FAILED OFF | | | | | SS1 FAILED ON | | | | |
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 1 | 0 | 1 | 1 | 0 | 1 | 1 | 2 |
| 2 | 0 | 1 | 0 | 1 | 2 | 0 | 1 | 1 | 2 |
| 3 | 1 | 0 | 0 | 3 | 3 | 1 | 0 | 1 | 4 |
| 4 | 1 | 0 | 0 | 3 | 4 | 1 | 0 | 1 | 4 |

GRV_STATE = 10 10 00 00 = 160    GRV_STATE = 11 11 01 01 = 245

FIG. 11

| SS2 FAILED OFF | | | | | SS2 FAILED ON | | | | |
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 0 | 0 | 3E | 1 | 0 | 1 | 0 | 1 |
| 2 | 0 | 0 | 1 | 2A | 2 | 0 | 1 | 1 | 2 |
| 3 | 1 | 0 | 0 | 3 | 3 | 1 | 1 | 0 | 1 |
| 4 | 1 | 0 | 1 | 4 | 4 | 1 | 1 | 1 | 2B |

GRV_STATE = 11 10 01 10 = 230    GRV_STATE = 01 00 01 00 = 068

FIG. 12

| SS3 FAILED OFF | | | | | SS3 FAILED ON** | | | | |
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 1 | 0 | 1 | 1 | 0 | 1 | 0 | 1 |
| 2 | 0 | 1 | 1 | 2 | 2 | 1 | 1 | 1 | 2B |
| 3 | 0 | 0 | 0 | 3E | 3 | 1 | 0 | 0 | 3 |
| 4 | 0 | 0 | 1 | 2A | 4 | 1 | 0 | 1 | 4 |

GRV_STATE = 01 10 01 00 = 100        GRV_STATE = 11 10 01 00 = 228

FIG. 13

| SS1 FAILED OFF SS2 FAILED OFF | | | | | SS1 FAILED OFF SS2 FAILED ON | | | | |
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 0 | 0 | 3E | 1 | 0 | 1 | 0 | 1 |
| 2 | 0 | 0 | 0 | 3E | 2 | 0 | 1 | 0 | 1 |
| 3 | 1 | 0 | 0 | 3 | 3 | 1 | 1 | 0 | 1 |
| 4 | 1 | 0 | 0 | 3 | 4 | 1 | 1 | 0 | 1 |

GRV_STATE = 10 10 10 10 = 170        GRV_STATE = 00 00 00 00 = 000

FIG. 14

| SS1 FAILED ON SS2 FAILED OFF ||||| SS1 FAILED ON SS2 FAILED ON |||||
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 0 | 1 | 2A | 1 | 0 | 1 | 1 | 2 |
| 2 | 0 | 0 | 1 | 2A | 2 | 0 | 1 | 1 | 2 |
| 3 | 1 | 0 | 1 | 4 | 3 | 1 | 1 | 1 | 2B |
| 4 | 1 | 0 | 1 | 4 | 4 | 1 | 1 | 1 | 2B |

GRV_STATE = 11 11 01 01 = 245    GRV_STATE = 01 01 01 01 = 085

FIG. 15

| SS1 FAILED OFF SS3 FAILED OFF ||||| SS1 FAILED OFF SS3 FAILED ON |||||
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 1 | 0 | 1 | 1 | 1 | 1 | 0 | 1 |
| 2 | 0 | 1 | 0 | 1 | 2 | 1 | 1 | 0 | 1 |
| 3 | 0 | 0 | 0 | 3E | 3 | 1 | 0 | 0 | 3 |
| 4 | 0 | 0 | 0 | 3E | 4 | 1 | 0 | 0 | 3 |

GRV_STATE = 10 10 00 00 = 160    GRV_STATE = 10 10 00 00 = 160

FIG. 16

| SS1 FAILED ON SS3 FAILED OFF | | | | | SS1 FAILED ON SS3 FAILED ON | | | | |
|---|---|---|---|---|---|---|---|---|---|
| GR_CM | SSS3 | SSS2 | SSS1 | Actual Gear | GR_CM | SSS3 | SSS2 | SSS1 | Actual Gear |
| 1 | 0 | 1 | 1 | 2 | 1 | 0 | 1 | 1 | 2B |
| 2 | 0 | 1 | 1 | 2 | 2 | 1 | 1 | 1 | 2B |
| 3 | 0 | 0 | 1 | 2A | 3 | 1 | 0 | 1 | 4 |
| 4 | 0 | 0 | 1 | 2A | 4 | 1 | 0 | 1 | 4 |

GRV_STATE = 01 01 01 01 = 085        GRV_STATE = 11 11 01 01 = 245

FIG. 17

| SS2 FAILED OFF SS3 FAILED OFF | | | | | SS2 FAILED OFF SS3 FAILED ON | | | | |
|---|---|---|---|---|---|---|---|---|---|
| GR_CM | SSS3 | SSS2 | SSS1 | Actual Gear | GR_CM | SSS3 | SSS2 | SSS1 | Actual Gear |
| 1 | 0 | 0 | 0 | 3E | 1 | 1 | 0 | 0 | 3 |
| 2 | 0 | 0 | 1 | 2A | 2 | 1 | 0 | 1 | 4 |
| 3 | 0 | 0 | 0 | 3E | 3 | 1 | 0 | 0 | 3 |
| 4 | 0 | 0 | 1 | 2A | 4 | 1 | 0 | 1 | 4 |

GRV_STATE = 01 10 01 10 = 102        GRV_STATE = 11 10 11 10 = 238

FIG. 18

| SS2 FAILED ON SS3 FAILED OFF | | | | | SS2 FAILED ON SS3 FAILED ON | | | | |
|---|---|---|---|---|---|---|---|---|---|
| GR_CM | SS3 | SS2 | SS1 | Actual Gear | GR_CM | SS3 | SS2 | SS1 | Actual Gear |
| 1 | 0 | 1 | 0 | 1 | 1 | 1 | 1 | 0 | 1 |
| 2 | 0 | 1 | 1 | 2 | 2 | 1 | 1 | 1 | 2B |
| 3 | 0 | 1 | 0 | 1 | 3 | 1 | 1 | 0 | 1 |
| 4 | 0 | 1 | 1 | 2 | 4 | 1 | 1 | 1 | 2B |

GRV_STATE = 01 00 01 00 = 068      GRV_STATE = 01 00 01 00 = 068

FIG. 19

| SS3 | SS2 | SS2 | GEAR | GRV_STATE |
|---|---|---|---|---|
| 0 | 0 | 0 | 3E | 10 10 10 10 = 170 |
| 0 | 0 | 1 | 2A | 01 01 01 01 = 085 |
| 0 | 1 | 0 | 1 | 00 00 00 00 = 000 |
| 0 | 1 | 1 | 2 | 01 01 01 01 = 085 |
| 1 | 0 | 0 | 3 | 10 10 10 10 = 170 |
| 1 | 0 | 1 | 4 | 11 11 11 11 = 255 |
| 1 | 1 | 0 | 1 | 00 00 00 00 = 000 |
| 1 | 1 | 1 | 2B | 01 01 01 01 = 085 |

FIG. 20

SHIFT SOLENOID FUNCTIONAL TEST STRATEGY FOR AN AUTOMATIC TRANSMISSION CONTROL SYSTEM HAVING ELECTRONIC SHIFT CONTROLLERS

TECHNICAL FIELD

The invention comprises an on-board diagnostic control mechanism for an automatic power transmission for automotive vehicles.

RELATED PATENT DISCLOSURE

This disclosure relates to the invention of U.S. patent application Ser. No. 135,936, filed Oct. 13, 1993 now U.S. Pat. No. 5,460,582, and entitled AUTOMATIC TRANSMISSION CONTROL SYSTEM RAVING ELECTRONIC SHIFT CONTROLLERS AND A FUNCTIONAL TEST STRATEGY.

BACKGROUND OF THE INVENTION

The invention is adapted especially to be used in a multiple-ratio, geared transmission of the kind disclosed in U.S. Pat. No. 5,150,297, dated Sep. 22, 1992. That patent is owned by the assignee of the present invention.

The control system of the '297 patent is adapted to be used with a multiple-ratio vehicle transaxle in an automotive vehicle driveline having an internal combustion engine with an adjustable throttle. The control system of the '297 patent has three shift valves that are actuated by three solenoid actuators. The shift valves are controlled by the actuators in a predetermined pattern to effect three ratio changes between the low ratio and an intermediate ratio, between an intermediate ratio and a direct-drive ratio, and between a direct-drive ratio and an overdrive ratio. The actuators respond to driveline variables so that the ratio changes can occur to meet operating demands as determined by sensors that detect, for example, vehicle speed, engine torque, drive range selector position, and engine operating temperature, as well as other variables.

The controllers are responsive to signals developed at the output driver portion of an electronic microprocessor, the input portion of which receives the signals from the driveline sensors.

The microprocessor includes diagnostic control modules for performing diagnostic strategies that detect when a control problem exists. A control problem may be the result of a hydraulic failure, a mechanical failure or an electronic failure. If failures of these kind are detected, error codes for the software may be called out by a service technician and proper repair action can be undertaken.

A control system of the kind disclosed in the '297 patent application has a valve system that cooperates with solenoid valve actuators. A change in state of the solenoid actuators results in a predictable shift response. The solenoid actuators operate in a predetermined sequence in order to effect a given ratio change.

SUMMARY OF THE INVENTION

The diagnostic strategy of the controller of the present invention is an extension of the known diagnostic strategy since it permits an identification of a specific shift solenoid when that shift solenoid fails. This is distinct from an identification of a general electrical failure or another type of failure that does not specifically identify a solenoid that is not functioning properly. The strategy makes use of a turbine speed sensing mechanism that is used also for the purpose of establishing shift control. In this respect, it differs significantly from the diagnostic strategy disclosed in related patent application Ser. No. 135,936, filed Oct. 13, 1993. That strategy is useful in an automatic transmission control system that does not employ an electronic turbine speed sensor.

The diagnostic strategy of the present invention modifies existing diagnostic strategy for automatic transmission control systems having electronic turbine speed sensors and uses known failure modes to perform functional testing on the shift solenoids without the need for providing additional hydraulic or electronic hardware. The results of the strategy make it possible to distinguish between a shift solenoid failure and a general electronic failure in the transmission system. It distinguishes also, of course, between a shift solenoid failure and other subsystem failures such as mechanical failures and hydraulic failures which affect gear selection.

Our invention includes a gear ratio validity test as part of the diagnostic control routine. This determines whether a currently commanded gear is functioning properly and also whether it actually corresponds to another valid gear ratio. Once each gear has been commanded by the microprocessor in response to varying driveline conditions, the result of that gear command is stored in the RAM portion of the microprocessor memory, indicating what gear ratio, if any, was present when the gear was commanded.

The results of the gear ratio validity logic are used to determine if the shift solenoids are failed. A shift solenoid failure will produce recognizable patterns with respect to which gears will be obtained when specific gears are commanded. If there is a failure mode that results in abnormal operation in only one of the four available gears, this cannot be a shift solenoid failure since a shift solenoid failure will affect at least two gears. The strategy will permit the identification of the characteristic operational results of solenoid electrical failures by comparing modified diagnostic information to those known patterns. If a match is found, it is flagged as the appropriate solenoid error and an error indicator light is illuminated. If no match is found for the failure patterns that are known to result from a possible discrete solenoid failure condition, then the indicator light is not illuminated. Conventional operator notification of failure mode effects management then can continue.

BRIEF DESCRIPTION OF THE FIGURES OF THE DRAWINGS

FIG. 8 is a chart showing the relationship between the actual gear and the two bit representation of the actual gear the transmission assumes.

FIG. 9 is a representation of a register in memory called GRV_STATE indicating the contents in the register which represents the status of each gear once that gear has been monitored at least once.

FIG. 10 is a chart showing which shift solenoid, if any, is the cause of a detected gear ratio error.

FIG. 11 is a chart showing the failure modes for the first of the three shift solenoids.

FIG. 12 is a chart showing failure modes for the second of the three shift solenoids.

FIG. 13 is a chart showing the failure modes for the third of the three shift solenoids.

FIG. 14 is a chart showing the failure modes for the first and the second shift solenoids.

FIG. 15 is a chart showing the failure modes when the first shift solenoid and the second shift solenoid have failed in a pattern that differs from the pattern of FIG. 14.

FIG. 16 is a chart showing the failure modes for the first and third shift solenoids.

FIG. 17 is a chart showing the failure mode when the first and third shift solenoids have failed in a pattern that differs from the pattern of FIG. 16.

FIG. 18 is a chart that shows the failure mode for the second and third solenoids.

FIG. 19 is a chart that shows the failure modes for the second and third solenoids in accordance with a pattern that differs from that pattern of FIG. 18.

FIG. 20 is a chart showing the failure mode for a triple solenoid failure.

PARTICULAR DESCRIPTION OF THE INVENTION

Transaxle

Figures 1, 2:
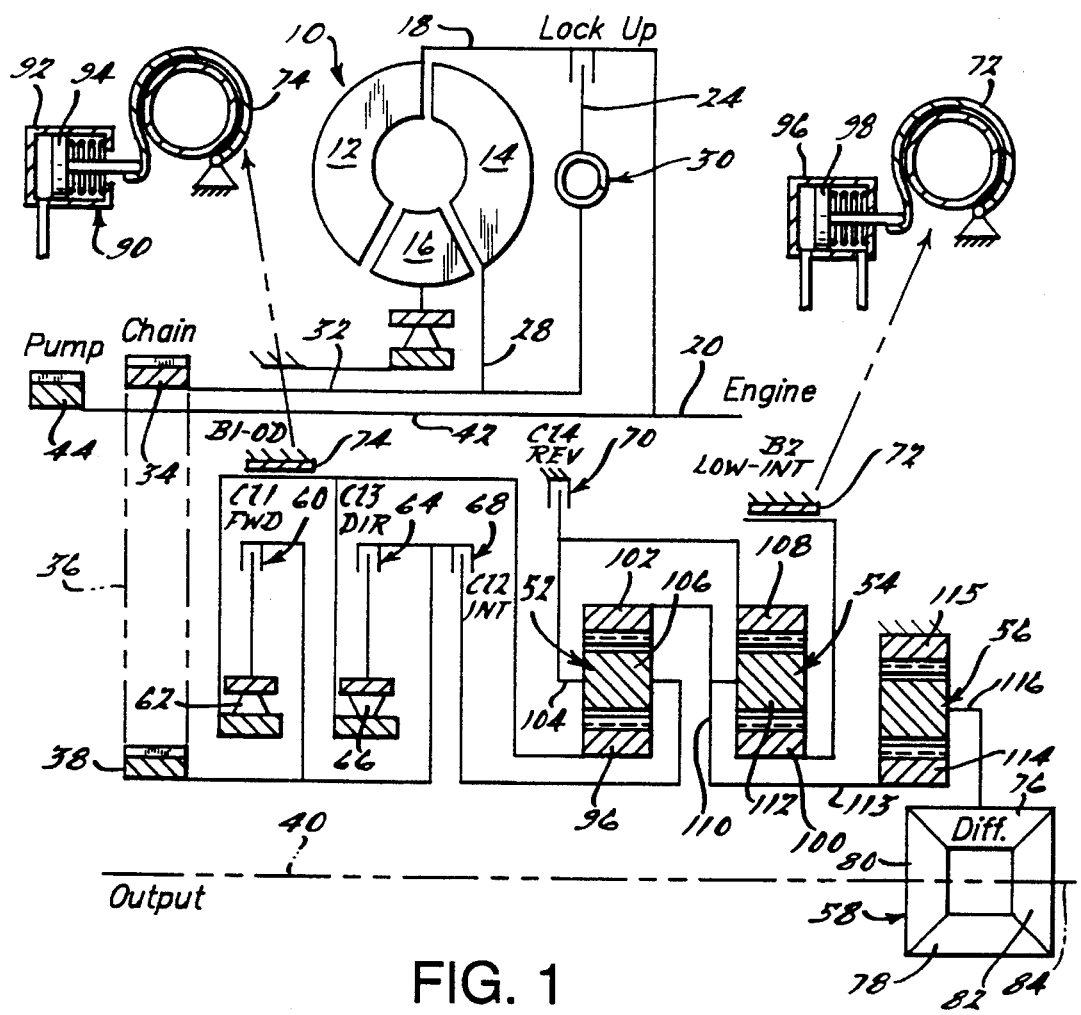
FIG. 1 is a schematic representation of an automatic transmission for an automotive vehicle having multiple ratio gearing and a hydrokinetic torque converter.
FIG. 2 is a chart that shows the clutch and brake engagement and release pattern for the transmission of FIG. 1.

Shown in FIG. 1 is a schematic cross-sectional view of the torque converter and planetary gearing of a transaxle capable of being controlled by the control system of the invention. The transaxle includes a torque converter 10 having a bladed impeller 12, a bladed turbine 14 and a bladed stator 16 arranged in a toroidal fluid flow circuit. The impeller 14 includes an impeller housing 18 which is connected drivably to an engine crankshaft 20 by means of a drive plate 22.

A bypass clutch assembly 24 is situated in the impeller housing 18 and is adapted to establish a mechanical torque flow path between the impeller and the turbine. The bypass clutch 24 includes a clutch plate 26 having an annular friction surface at an outward radial location which engages a friction surface on an outward radial portion of the impeller housing 18. Clutch plate 26 is connected to the hub 28 of the turbine 14 by means of a torsional damper assembly 30. A turbine sleeve shaft 32 is connected drivably to a driving sprocket 34 of a torque transfer chain drive, which includes a drive chain 36 and a driven sprocket 38 located on the axis of a torque output shaft 40.

The impeller housing 18 is connected drivably by means of central shaft 42 to a positive displacement gear pump 44 which serves as a fluid pressure source for the control valve system. The control valve system is located in a valve body secured to a housing portion enclosing the chain transfer drive.

The planetary gear units for the transaxle comprise a first simple planetary gear unit 52 and a second simple planetary gear unit 54. A final drive gear unit 56 is located on the torque output side of the planetary gear units between the gear units and a differential gear assembly 58.

The speed ratios achieved by the two simple planetary gear units are controlled by a forward clutch 60 and a low ratio overrunning coupling 62, a direct clutch 64, a direct overrunning coupling 66, an intermediate clutch 68, and a reverse clutch 70. In addition to the clutches and the overrunning couplings, there are two friction brakes comprising low-and-intermediate brake bands 72 and overdrive brake band 74.

The differential gear assembly 58 includes differential pinions 76 and 78, which mesh with differential side gears 80 and 82. Side gear 80 is splined to one end of output shaft 40, and side gear 82 is splined to a companion output shaft 84. Universal joint assemblies connect the shafts 40 and 84, respectively, to axle half shafts for each of the vehicle traction wheels.

A fluid pressure operated brake servo applies and releases overdrive brake band 74. That servo comprises a cylinder and a servo piston that define a pressure chamber which, when pressurized, applies brake band 74, thereby anchoring sun gear 96 for the planetary gear unit 52.

Low-and-intermediate brake band 72 is applied and released by a brake servo comprising a cylinder and a double-acting piston located within the cylinder. The piston 98 and cylinder 96 define a pair of opposed pressure chambers. When both chambers are pressurized, brake band 72 is released. When the pressure chamber on one side of the piston 98 is pressurized, the pressure chamber on the other side of the piston is exhausted and the piston is stroked, thereby engaging the brake band 72 and anchoring sun gear 100 for gear unit 54.

Gear unit 52 comprises, in addition to the sun gear 96, a ring gear 102, a carrier 104, and planet pinions 106 journalled on the carrier 104. Pinions 106 mesh with ring gear 102 and sun gear 96.

Gear unit 54 comprises, in addition to sun gear 100, ring gear 108, carrier 110 and planet pinions 112 journalled on the carrier 110.

Ring gear 102 of the gear unit 52 is connected drivably to carrier 110 which, in turn, is connected to output shaft 113 which delivers torque directly to sun gear 114 of the final drive gear unit 56. Ring gear 115 of the gear unit 56 is connected to and anchored by the transmission housing. Carrier 116 of gear unit 56 is connected directly to the differential housing which supports the pinion shaft on which the pinions 76, 78 are journalled.

The forward clutch 60, the direct clutch 64, the intermediate clutch 68 and the reverse brake 70 are actuated by their respective servo pistons, which are received in servo cylinders and which define with the cylinders pressure working chambers that energize multiple friction discs. In each instance, a piston return spring acts on the piston to oppose the fluid pressure force of the working pressure.

The chart of FIG. 2 shows the clutch and brake engagement and release pattern for the clutches and brakes illustrated schematically in FIG. 1. For purposes of correlating the schematic representation of FIG. 1 with the chart of FIG. 2, the forward clutch is identified in FIG. 2 by the symbol CL1, the direct clutch 64 is identified in FIG. 2 by the symbol CL3, the intermediate clutch 68 is identified in FIG. 2 by the symbol CL2, the reverse brake 70 is identified in FIG. 2 by the symbol CL4, the low-and-intermediate brake band 72 is identified in FIG. 2 by the symbol B2, and the overdrive brake band 74 is identified in FIG. 2 by the symbol B1. Further, the forward overrunning coupling 62 is identified in FIG. 2 by the symbol OWC1, and the direct overrunning coupling 66 is identified in FIG. 2 by the symbol OWC2.

The gear ratios that may be obtained with the gearing Of FIG. 1 are listed in the left-hand vertical column of FIG. 2. The corresponding clutch or brake that is applied to achieve any given gear ratio is identified in FIG. 2 by the symbol X. In the case of the overrunning couplings, the engaged state of the overrunning coupling ms identified in FIG. 2 by the symbol X; and the overrunning state is identified by the symbol OR, which is an overrunning condition.

The various drive ranges that may be obtained for the transmission structure of FIG. 1 are determined by the position of a manual valve, which will be described with reference to FIG. 4A.

To obtain the low-speed driving ratio, clutch CL1 is applied, as indicated in FIG. 2. If coast braking is desired in low ratio, direct clutch Cl3 is applied. On the other hand, if the transmission is conditioned for the normal drive mode with a full range of ratios, clutch CL3 is not applied and no braking torque is available since overrunning coupling OWC2 transmits torque reaction in only one direction.

Low-and-intermediate brake band B2 is applied in low ratio, thereby anchoring sun gear 100 which serves as a reaction point. The torque on the driven sprocket 38 thus is transferred through the forward clutch CL1 to the sun gear 96. A split torque delivery path, therefore, occurs through gear unit 52 as the carrier 104 drives a ring gear 108 which, in turn, delivers torque to the carrier 110 and the output shaft 112.

A ratio change from the low speed ratio to the intermediate speed ratio is achieved by engaging clutch CL2 This causes overrunning coupling OWC1 to freewheel as torque is transferred through the engaged clutch 68 to the carrier 104. A ratio change from the intermediate ratio to the direct drive ratio is achieved by engaging clutch CL2 as clutch CL1 is released. Clutch CL3 remains applied so all of the elements of the gear units rotate together in unison with a one-to-one ratio.

Overdrive ratio is achieved by continuing to release clutch CL3, by continuing to apply clutch CL2, and by continuing to apply clutch CL3 as the overdrive brake band B1 is applied. Since the sun gear 96 is anchored by the overdrive brake band, the ring gear 102 and the output shaft 112 are overdriven. Overrunning coupling OWC2 freewheels during overdrive.

Reverse drive is achieved by engaging simultaneously clutch CL1 and reverse brake CL4. Clutches CL2, CL3, and brake B1 are released. Torque of the driven sprocket 38 then is transferred through clutch CL1 and the overrunning coupling OWC1 to the sun gear 96. Since carrier 104 is anchored by the reverse brake CL4, ring gear 102 is driven in a reverse direction together with output shaft 112.

Figure 4A:
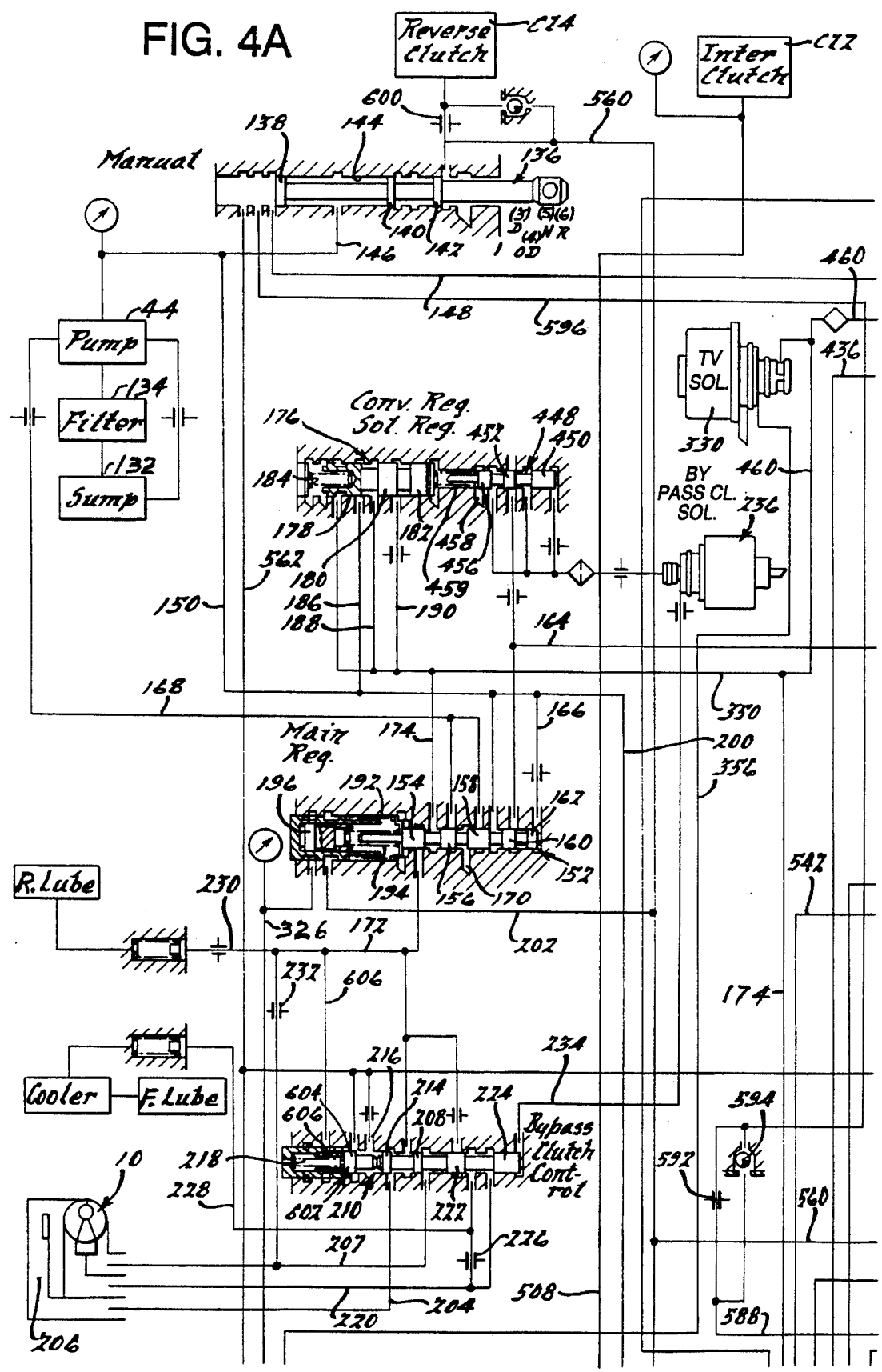
FIGS. 4A through 4D show a control valve circuit for controlling the ratio changes for the transmission of FIG. 1.
Figure 4B:
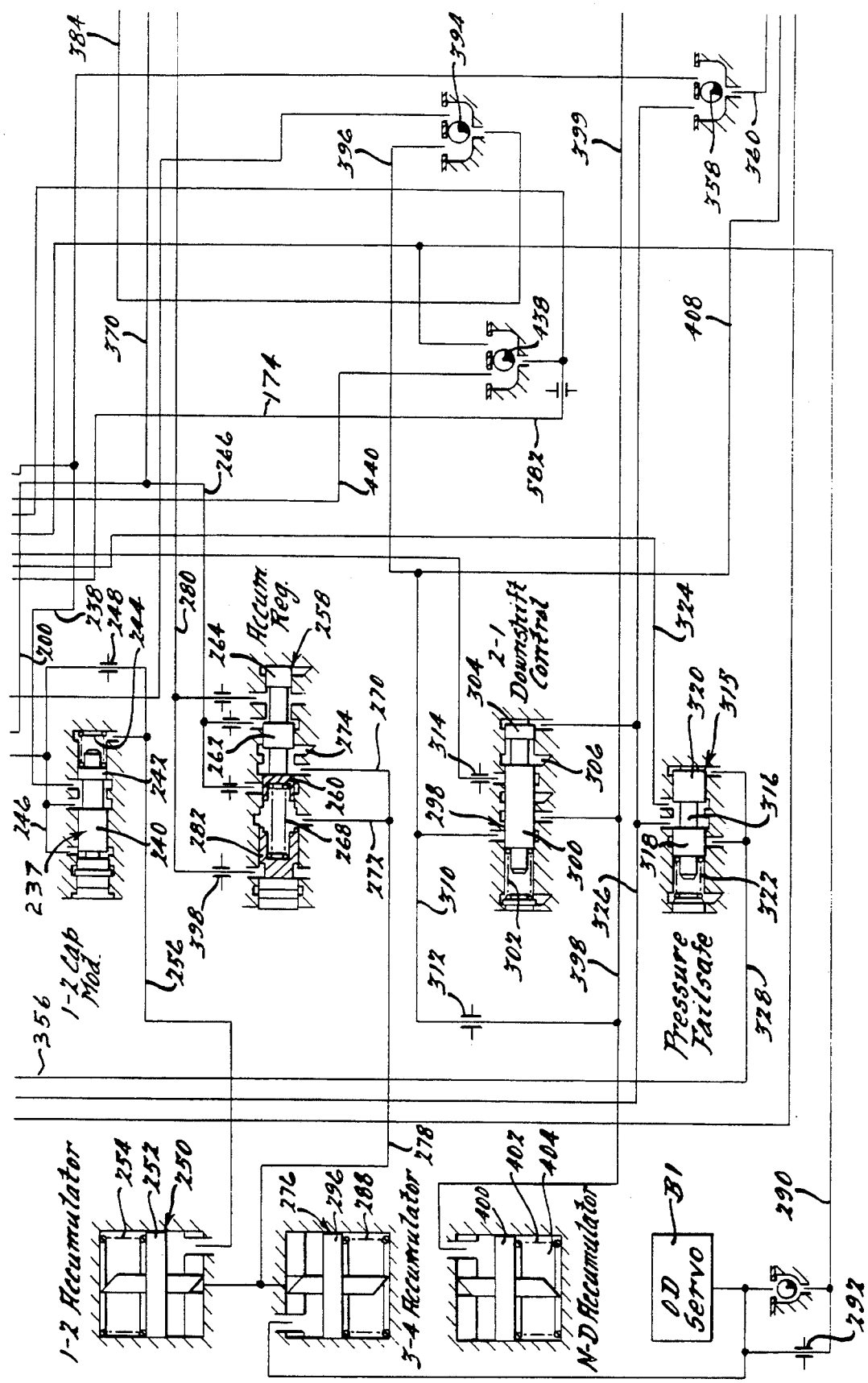

The Control Valve Circuit of FIGS. 4A and 4B

The drive shaft 42, which extends through the torque converter 10 drives the pump rotor 118.

As the rotor is driven, pump vanes rotate within the pump cavity, thereby developing a fluid pressure in known fashion. Fluid is supplied to the intake ports for the pump 44 from sump 132 through filter 134.

Fluid is supplied from the pump to manual valve 136 shown in FIG. 4A. This valve comprises a valve spool with spaced lands 138, 140 and 142 which register with internal valve lands in manual valve bore 144. The manual valve, in known fashion, may be adjusted by the vehicle operator to any drive range position. In the embodiment disclosed in this specification, the positions are drive range D, which provides for three forward driving ratios; an overdrive position OD, which conditions the transmission for operation in each of four forward driving ratios including an overdrive; a manual low position; a neutral position N and a reverse drive position R. In the position shown in FIG. 4A, manual valve 136 distributes pressure from pump supply passage 146 to passage 148 which is pressurized during operation of overdrive OD and drive range D.

The manual valve also supplies passage 150, which leads to main regulator valve spool 152. Regulator valve spool 152 comprises lands 154, 156, 158, 160 and 162. The first three lands are of equal diameter, but land 162 has a smaller diameter. This permits line pressure from passage 164 to be distributed to the differential area of lands 160, 162 during operation in the second, third and fourth ratios following an upshift from the first ratio. Pump pressure passage 150 supplies the valve chamber for the valve spool 152 at a location intermediate lands 158, 160. The feedback passage 164, including a control orifice, provides for a pressure regulating feedback pressure.

An output pressure passage 168 communicates with ports that register with lands 156 and 158, and exhaust port 170 is located between the lands 156 and 158. A regulated converter pressure in passage 174 communicates with passage 172 when land 154 uncovers passage 172.

Passage 174 is supplied with pressure from converter regulator valve assembly 176. This valve assembly comprises pressure regulating valve lands 178, 180, and 182 which are spring loaded in a right-hand direction by valve spring 184. Pump pressure is supplied to the converter regulator valve through passage 186. Passage 188 feeds passage 174 described previously as converter regulator valve assembly 176 modulates the pressure in passage 186, with passage 190 being a feedback passage.

The main regulator valve assembly includes valve springs 192 and 194. A TV booster valve element 196 provides an anchor for the spring 194. When throttle valve pressure is admitted to the left side of the valve element 196, the fluid pressure force is transmitted to the valve 152 through the spring.

The presence of a throttle valve pressure on the valve element 196 will cause an increase in the spring force of spring 194, thereby increasing the regulated line pressure made available to line pressure passage 200. During operation in reverse drive, reverse line pressure from passage 202 is distributed to the differential area of spaced lands on the valve element 196, thereby creating an additional force on the spring 194 which augments the line pressure in passage 200.

Passage 172, which receives regulated converter pressure from passage 174 through the space between lands 154 and 156, communicates with bypass clutch passage 204. This pressure regulates the pressure made available to the control space 206 of the torque converter 10. Passage 172 communicates with lube pressure passage 207 when land 208 of the bypass clutch control valve 210 uncovers passage 172 leading to passage 207. Regulated converter pressure in passage 172 acts on the differential area of lands 208 and 214. Land 208 registers with the port communicating with passage 172, and land 214 registers with the land adjacent port 216 which is exhausted through the manual valve. Thus, the bypass clutch pressure in passage 204 is a regulated pressure.

Valve 210 is urged in a right-hand direction by valve spring 218.

Converter fluid is returned from the converter through passage 220 and passes through the space in the bypass clutch control intermediate valve lands 222, 224. This flow complements the flow of converter return fluid through orifice 226. The fluid in passage 220 ultimately is distributed to lubrication passage 228 and the front lubrication circuit, the rear lubrication circuit including passage 230 communicates with passage 172 and with passage 206 through orifice 232.

The bypass clutch control valve 210 is a regulating valve, as explained previously. The regulating valve lands are the differential diameter lands 214 and 208. It regulates converter pressure and produces a bypass pressure in passage 204.

Converter pressure is subject to variables such as changes in throttle opening, road conditions, etc. In order to make the bypass clutch pressure insensitive to such variables in converter pressure, the bypass clutch control valve 210 is provided with a valve element 602 that engages the main valve spool. The spring 218 acts directly on the element 602. Element 602 comprises a valve land 604 and a valve extension 606, the diameter of land 604 being greater than the diameter of extension 606. This creates a differential area which communicates with converter pressure passage 172 through passage 606. The effective area on the valve element 604 is the same as the differential area of valve lands 208 and 210. Thus, a change in converter pressure due to a variation in operating variables will produce a force on the main valve spool that is canceled by the corresponding force on the valve element 604.

Thus, when the bypass clutch is calibrated to produce a desired slip for any given operating condition, the magnitude of that desired slip may be changed only by changing the duty cycle of the bypass clutch solenoid. A change in converter pressure will not require a compensating change in the duty cycle, and the control of the clutch thus is improved with respect to reliability. Torque fluctuations due to changing clutch capacity are avoided.

The regulated pressure level maintained by the bypass clutch control is changed by introducing a bypass clutch solenoid pressure to the right end of land 224 through passage 234.

Passage 242 communicates with passage 234 indicated in FIG. 4A. Thus, the magnitude of the pressure in passage 234 is related inversely and proportionately to the pressure in passage 204.

Ratio changes from low ratio to the intermediate ratio are cushioned by capacity modulator valve 237, which is supplied with fluid through feed line 238 when the transmission is operated in the second, third or fourth ratio. Line pressure is distributed through passage 238 to the 1–2 capacity modulator valve at a location intermediate lands 240 and 242, as seen in FIG. 4B. That valve includes a pressure regulating valve spring 244 which opposes feedback pressure distributed to the left side of the land 240 through feedback pressure passage 246. Intermediate clutch pressure is fed from the valve 237 through orifice 248 to the 1–2 accumulator 250, which includes an accumulator chamber defined in part by a piston 252, which is biased by accumulator piston spring 254. The pressure on the other side of the piston 252 is distributed to the accumulator 250 through passage 256.

The accumulator pressures for the 1–2 accumulator and the 3–4 accumulator are developed by the accumulator regulator valve 258. This comprises spaced lands 260, 262 and 264, lands 262 and 264 having a differential area which is subjected to pump pressure in passage 266. That passage communicates with passage 200 discussed with reference to FIG. 4A. A regulator spring 268 urges the regulator valve spool toward the right. The regulated output pressure of the accumulator regulator 258 is line 270 which communicates with the spring side of the 3–4 accumulator and the 1–2 accumulator. Feedback pressure is distributed to the left side of the land 260 through passage 272. Land 262 registers with exhaust port 274, and land 260 registers with a port that communicates with passage 266, thereby providing each of these two accumulators 250 and 276 with a pressure that opposes a spring force, the accumulator pressure being delivered to the accumulator 276 as well as to the accumulator 250 through passage 278.

Forward clutch pressure is delivered from a forward clutch control, to be described subsequently, through line 280. This pressure shortens the spring 268 as front clutch pressure acts on the left side of the plunger 282. The stroke pressure for the 1–2 accumulator then will rise or fall, depending upon the magnitude of the line pressure in passage 280.

Unlike the case of the front clutch pressure on a 1–2 shift, the 3–4 line pressure does not act on the plunger 282 to shorten the spring. Thus, it does not modify the output pressure in line 278 received by the 3–4 accumulator. Thus, the accumulator-regulator functions during a 3–4 shift as brake B1 becomes applied.

The 3–4 accumulator includes piston 286 and an accumulator spring 288 acting on the piston to supplement the force of the accumulator-regulator pressure supplied to the 3–4 accumulator to passage 278.

Overdrive servo pressure is supplied to the overdrive servo B1 through line 290. The pressure in passage 290, after passing through orifice 292, is transmitted to the upper side of the piston 296 of the 3–4 accumulator.

Neutral-to-drive engagements are regulated by 2–1 downshift control 298. This control comprises valve spool 300 situated in a valve chamber and includes a valve that is urged in a right-hand direction by valve spring 302. It is urged in a left-hand direction by throttle valve pressure which acts on the right side of land 304.

During a 2–1 downshift, the intermediate clutch exhaust flow path from the intermediate clutch includes line 304. If the 2–1 downshift is a power-on downshift, throttle pressure is sufficient to move the valve to the left, allowing intermediate clutch exhaust fluid to exhaust through exhaust port 306. If the 2–1 downshift is a coasting downshift, the valve 300 will assume the position shown in FIG. 4B, and line pressure from line pressure passage 310 passes through orifice 312 as line pressure is fed through the engagement valve to be described subsequently. Thus, a second orifice is introduced during a power-on downshift, the first orifice in the intermediate clutch exhaust flow path being orifice 314 and the second orifice being orifice 317 in FIG. 4C. This allows the intermediate clutch to be applied more quickly than in the case of a coasting 2–1 downshift.

Shown in FIG. 4B is a pressure fail-safe valve 315 which comprises a simple shuttle valve spool 316 having spaced valve lands 318 and 320. Valve spring 322 urges the spool 316 in a right-hand direction, as viewed in FIG. 4B.

When the valve spool 316 is positioned as shown in FIG. 4B, converter regulator output pressure in passage 324 communicates directly with TV passage 326. This pressure acts on the left side of throttle booster valve element 196 of the main regulator valve assembly described with reference to FIG. 4A.

During normal operation, variable force solenoid pressure is distributed to the right end of land 320 through passage 328. This pressure is developed by variable force TV solenoid valve 330 shown in FIG. 4A. Under the influence of variable force solenoid pressure, valve element 316 is shifted to the left, thereby establishing communication between passage 326 and passage 328 so that line pressure can be distributed to the booster element of the main regulator valve assembly of FIG. 4A. Thus, if the variable force solenoid circuit should fail for some reason, or if the valve should stick and become nonfunctional, line pressure will be boosted to a maximum by the main pressure regulator valve as converter regulator output pressure is substituted for TV pressure at the booster valve element 196.

Signal passage 354 communicates with variable force solenoid passage 356 which communicates with passage 328 in FIG. 4B.

Figure 4C:
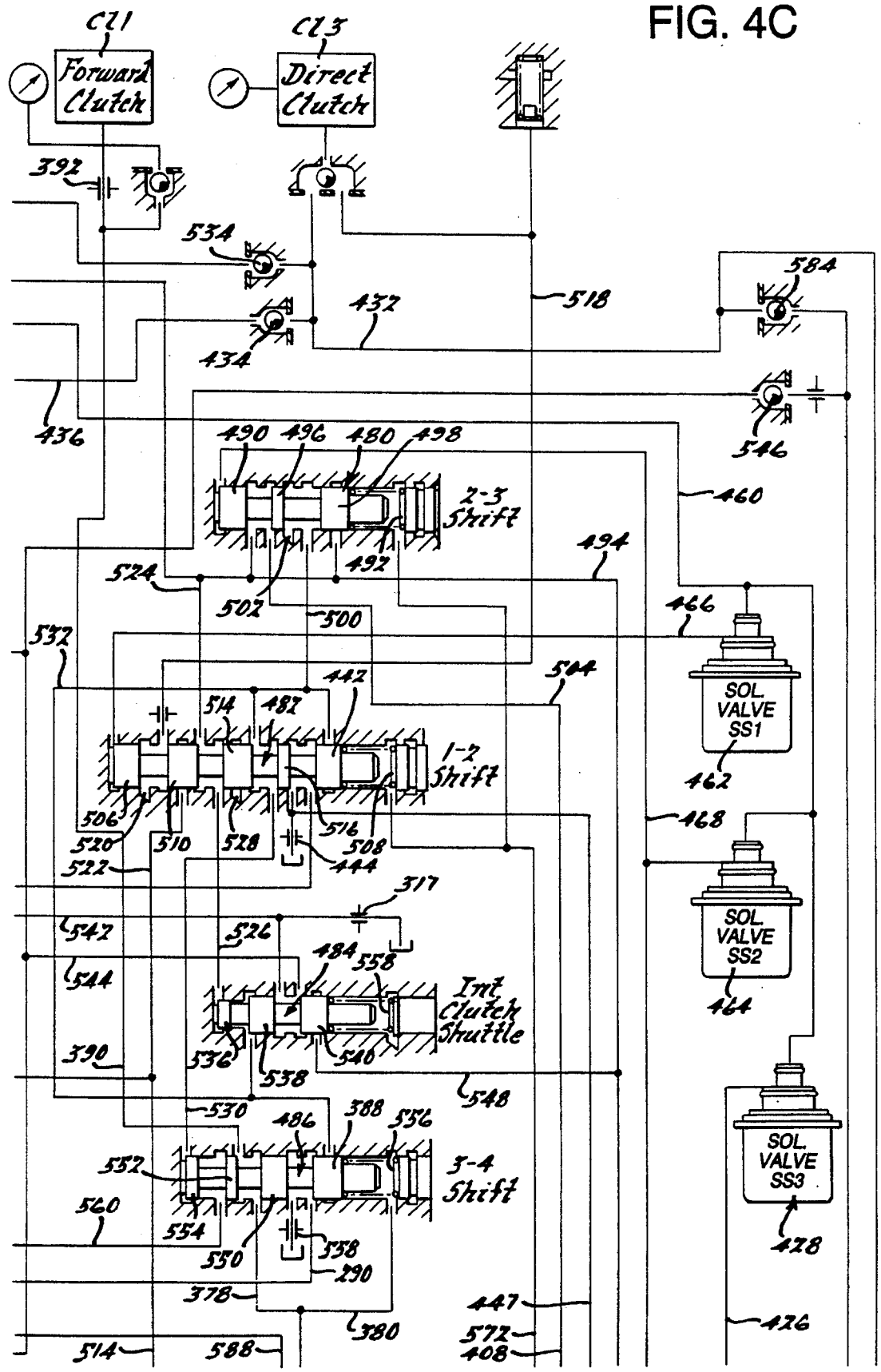

Throttle valve pressure is distributed to passage 326 and to the main pressure regulator as explained previously. The same pressure is distributed through ball valve 358, as seen in FIG. 4C and to TV pressure passage 360, which acts on the right end of engagement valve 362 shown in FIG. 4C.

Figure 4D:
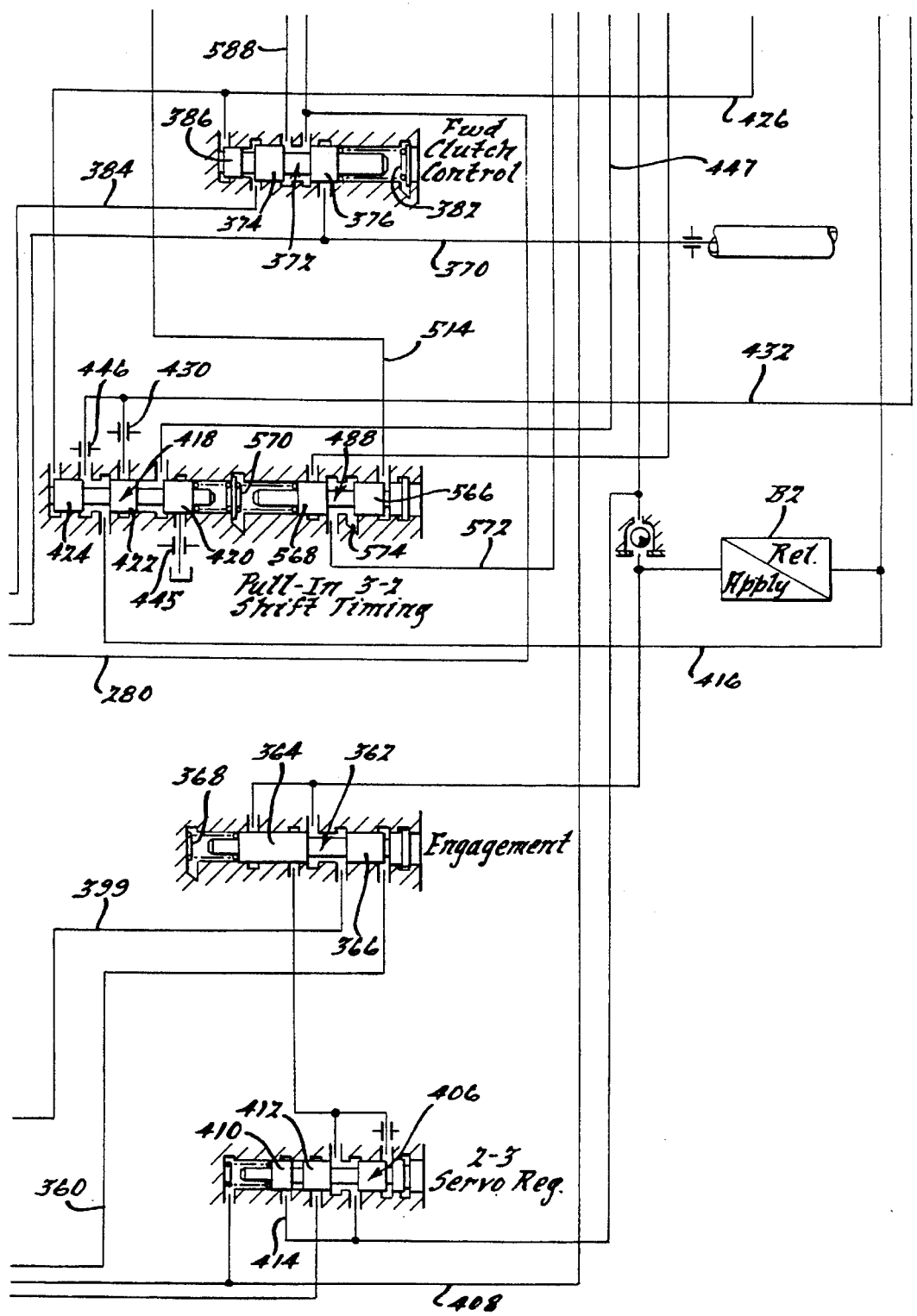

The Control Valve Circuit Of FIG. 4D

Engagement valve 362 comprises lands 364 and 366 which may be of equal diameter. It is urged in the right-hand direction by valve spring 368.

On a neutral-to-drive shift of the manual valve, pump pressure in passage 200 will be distributed through passage 370 to the forward clutch control valve 372. Forward clutch control valve 372 comprises a valve spool having lands 374 and 376. When the valve 372 moves to the right position against the opposing force of spring 382, line pressure from passage 370 will be delivered directly to passage 378 and through 3–4 shift valve 388 to the front clutch feed passage 390. Orifice 392 is located in feed passage 390 to cushion the engagement of the forward clutch CL1. The valve assumes the right-hand position, as seen in FIG. 4D, as pressure in passage 384 acts on the differential area of lands 374 and 386. Passage 384 receives its pressure from three-position check valve 394, which communicates through the check valve with line pressure passage 396.

As the forward clutch becomes pressurized, pressure builds up in passage 378, which is transferred through line 280 to the orifice 398 in FIG. 4B, thus shifting the spring seat 382 of the accumulator-regulator valve. This shortens the accumulator valve spring, as explained previously. A coasting 2–1 downshift results in a pressure build-up in passage 399 which communicates with the neutral drive accumulator, as indicated in FIG. 4B.

This accumulator comprises a piston 400 with an accumulator chamber spring 402 and an accumulator volume 404. Line pressure for the low-and-intermediate servo B2 acts on the upper end of the piston 400 and cushions the engagement of the servo as pressure is delivered to the apply side of servo B2 through the engagement valve 362. During a coasting 3–2 downshift, it is necessary for the brake servo B2 to become applied. The 2–3 servo regulator 406 acts as a regulator valve in this instance as fluid is delivered to the apply side of the brake servo B2 through the engagement valve 362, which is moved to the left by pressure in passage 360.

There is no line pressure in passage 408 at the beginning of a coasting 3–2 downshift. Thus, the valve 406 may act as a regulator valve on a coasting 3–2 downshift. The feedback pressure for the differential area of lands 410 and 412 communicates with feedback passage 414. After the downshift is completed, the control strategy for the solenoid 464 in FIG. 4C will delay turning on the solenoid. After the coasting downshift is done, the solenoid is turned on.

On a torque demand 3–2 downshift, line pressure is present in line 408. This line pressure from line 494 passes directly through the valve 406 and through the engagement valve to the apply side of servo B2.

On a 3–2 shift, as the servo B2 becomes applied, fluid is released from the release side of the servo. The release fluid passes through line 416 to the 3–2 shift timing valve shown at 418 in FIG. 4D. The valve 418 includes three spaced valve lands of equal diameter, as shown at 420, 422 and 424. When the valve is positioned as shown, line 416 communicates with passage 432 which has in it orifice 446. Passage 432 extends to the direct clutch exhaust line. On a 3–2 downshift at high speeds, the timing valve 418 will be moved to the right. This is accomplished by pressurizing passage 427 by solenoid valve 428. This also pressurizes the left end of the forward clutch valve 372 causing it to shift to the right and to connect pump pressure line 372 to the forward clutch feed line 390 through the 3–4 shift valve. The release side of brake B2 then is exhausted through passage 416 and through orifice 430 in the line 432. Fluid from the working chamber of the direct clutch CL3 then is discharged through orifice 455 as well as orifice 444 in the 1–2 shift valve, which communicates with orifice 445 through line 447. Line 432 extends through check valve 434 to line 436 and through check valve 438 to line 440. This line extends to the 1–2 shift valve 482 at land 442 which, under these conditions, assumes the left-hand position shown in FIG. 4C. Line 440 then is exhausted through orifice 444 to the reservoir.

Referring again to FIG. 4A, the solenoid regulator valve 448 includes three lands 450, 452 and 456, the latter registering with exhaust port 458. Valve 448 is biased in a right-hand direction by valve spring 460. Line pressure from passage 164, which is pressurized during second, third and fourth ratio is distributed to the valve 448. That pressure is regulated at a constant value by the valve 448 which distributes pressure to the intake side of the bypass clutch solenoid. The output from the bypass clutch solenoid 236 is delivered to the bypass clutch control through passage 234, as previously explained.

Regulated converter pressure is delivered to passage 460, which feeds the TV solenoid 330 and each of the shift solenoids 462 and 464 in addition to the third solenoid 428 described previously. Each of the solenoids 462, 464 and 428 is normally open. When they are not energized, solenoid feed pressure is delivered directly from passage 460 to signal passages 466, 468 and 426, respectively. The solenoids are on-off solenoids. Flow from the feed passage 460 to each of the signal passages is interrupted when they are energized.

Solenoid valve 428 provides a signal in passage 426, which is distributed to the left end of land 427 of the 3–2 shift timing valve 418. The solenoid, under the control of the microprocessor, then will actuate the valve so that a selection may be made of the large orifice 432 or the smaller orifice 446. This distinguishes between the high speed 3–2 shift timing requirement and a low speed shift timing requirement as explained previously.

Solenoid 428 supplies also a signal to the left end of land 386 of the forward clutch control valve 372. This is done in order to provide engine braking in third gear which requires application of the forward clutch. The differential area of lands 374 and 386 is not pressurized, as explained previously, during operation in third gear and overdrive.

Control Valve Circuit Of FIG. 4C

The ratio changes in the transmission are under the control of the 2–3 shift valve, the 1–2 shift valve, the intermediate clutch shuttle valve, the 3–4 shift valve and the pull-in valve. These valves are respectively identified by reference numerals 480, 482, 484, 486 and 488. Each of these valves is a shuttle valve and can assume either one position or the other depending upon whether a solenoid pressure signal is available. Thus, ratio changes between each of the four ratios can occur as each of the individual valves performs multiple functions. The 2–3 shift valve has a solenoid valve pressure land 490. That pressure is pressurized by solenoid valve pressure from solenoid 464, which is distributed to the 2–3 shift valve through passage 468. Valve 480 includes a valve spring 492 which moves it to the left when a solenoid valve signal in passage 468 is absent. Line pressure exists in passage 494 when the manual valve is in the overdrive position, the D position, or the 1 position. Valve lands 496 and 498 on the 2–3 shift valve establish communication between passage 494 and passage 500 when valve 480 is shifted in a right-hand direction against the force of spring 492. When the valve 480 assumes the position shown in FIG. 4C, passage 500 communicates with exhaust port 502.

The solenoid valve 464 will develop a pressure in passage 468 that shifts the valve to the right to condition the transmission for operation in third and overdrive ratios. During operation in the first and intermediate ratios, spring 492 urges the valve 480 in a left-hand direction. When the valve 480 is in the left-hand position, passage 500 is exhausted through port 502 and the passage 494 communicates with passage 504, which is connected to passage 408 as seen in FIG. 4D.

The 1–2 shift valve 482 assumes the position shown in FIG. 4C during operation in the second and the fourth ratios. During operation in the first and third ratios, it is shifted to the right. The shifting movement is established as the valve 482 responds to a signal in passage 466 from the solenoid valve 462. The signal acts on the left side of land 506. Valve spring 508 normally shifts the valve 482 in a left-hand direction.

Valve 482, in addition to land 506, includes lands 510, 514 and previously described land 442. When the valve is positioned as shown in FIG. 4C, the direct clutch apply pressure in passage 518 is exhausted through exhaust port 520. When the valve 482 is shifted in a right-hand direction, line pressure passes directly from passage 522 to the direct clutch feed passage 518 whenever passage 522 is subjected to line pressure. That condition exists when the manual valve is shifted to a manual low range position.

When the valve 482 is positioned to the left, as shown in FIG. 4C, communication is established direction between line pressure supply passage 524 and passage 526, the latter extending to the shuttle valve 484. Passage 524 is connected to passage 148 shown in FIG. 4A whenever the manual valve is in the overdrive position, the drive position D or the manual low position. Passage 526 is exhausted through exhaust port 528 when the valve 482 is shifted in a right-hand direction during operation in the first and third ratios.

When the valve 482 is shifted in a left-hand direction, communication is established between feed passage 530 for the 3–4 shift valve and passage 532, which communicates with passage 500 described previously. Passage 532 serves as a feed passage for the intermediate clutch shuttle and the 3–4 shift valve. Passage 530, which is a signal passage for the 3–4 shift valve, communicates with exhaust orifice 444 through the 1–2 shift valve when the shift valve is shifted in a right-hand direction. When it is in that position, passage 532, which communicates with the line pressure passage 494 through the 2–3 shift valve, communicates with passage 440 which supplies line pressure to the direct clutch CL3 through one-way check valve 534 as shown in FIG. 4C.

When passage 526 is pressurized as the 1–2 shift valve moves to the left-hand position during operation in the second and fourth ratios, the intermediate clutch shuttle valve 484 will be shifted to the right as land 536 becomes pressurized. Intermediate clutch shuttle valve 484 includes, in addition to the land 536, lands 538 and 540 which establish communication between intermediate clutch exhaust passage 542 and line pressure feed passage 544. Passage 544 is connected to passage 164, which is pressurized during operation in the second, third and fourth ratio.

The release side of the low-and-intermediate servo B2 is exhausted through orifice 317 and one-way check valve 546 when the transmission is conditioned for operation in the second, third and fourth ratios. If the shuttle valve is shifted to the right, passage 544 is connected to line pressure feed passage 548. This feed passage is connected to passage 148 described with reference to the manual valve of FIG. 4A.

The intermediate clutch shuttle valve thus will interrupt the supply of line pressure to passage 544 and prevent application of the low-and-intermediate servo whenever the solenoid valve signal for solenoid valve 462 is exhausted from passage 466. That corresponds, as explained previously, to the position of the 1–2 shift valve shown in FIG. 4C.

The 3–4 shift valve 486, in addition to the land 388, includes valve lands 550, 552 and 554. The 3–4 shift valve 486 is urged in the left-hand direction by a valve spring 556. The corresponding valve spring for the intermediate clutch shuttle valve is shown at 558. The overdrive servo B1, which is supplied through passage 290 as explained previously, is exhausted through control orifice 558 when the 3–4 shift valve is positioned as shown. This releases the overdrive brake B1.

Passage 290 is connected to passage 532 when the 3–4 shift valve is shifted in a right-hand direction. Passage 532 is pressurized, as explained previously, during operation in the third and fourth ratios. This causes the overdrive brake servo to become applied. The 3–4 shift valve can be shifted in the right-hand direction only if passage 530 is pressurized, and that occurs only when the 1–2 shift valve is in the left-hand position, thereby permitting distribution of line pressure from passage 532 through the 1–2 shift valve.

During operation in reverse, the 3–4 shift valve 486 is shifted in a right-hand direction under the force of the reverse line pressure in passage 560, which acts on the differential area of lands 554 and 552. This allows reverse line pressure from passage 560 to pass directly through the 3–4 shift valve to the front clutch feed passage 390.

Pull-in valve 488 is available to supply a shift signal for the 1–2 shift valve and the 2–3 shift valve if the control system should lose power, thereby rendering solenoid valves 462 and 464 inoperable. These are normally open valves; so if a power failure occurs, converter regulator output pressure in passage 350 will pass directly into lines 466 and 468. This normally would shift the 2–3 shift valve in a right-hand direction and will shift the 1–2 shift valve 482 in a right-hand direction against the opposing force of their respective springs. As soon as the operator is aware of a power failure, he may move the manual valve to the "1" position whereby regulated pump pressure is delivered to line 562. This pressure is delivered to passage 564 and to the right side of land 566 of the pull-in valve.

The pull-in valve comprises, in addition to the land 566, a land 568. A valve spring 570 normally urges the pull-in valve to the right. Signal passage 468 communicates with the pull-in valve; and when the valve assumes the position shown, land 568 blocks passage 468. At the same time, signal passage 572 is exhausted through exhaust port 574. When the operator pulls the manual valve to the manual low range position, line pressure will be distributed to the right side of the land 466 and shift the valve 488 in a left-hand direction, thereby blocking exhaust port 574 and opening passage 468 to passage 572. Thus, a new signal passage is made effective. That signal passage identified by numeral 572 distributes line pressure to a spring chamber for spring 508 of the 1–2 shift valve and to the spring chamber for spring 492 of the 2–3 shift valve. This returns each of the shift valves to their left-hand positions. Thus, the transmission will be conditioned for continuous operation in the intermediate speed ratio. In an emergency, therefore, the vehicle operator may drive the vehicle in intermediate ratio to a service center where the voltage failure can be repaired.

Summary Of Operation Of Valve System

For the purpose of summarizing the valve functions during operation in each of the four forward driving ratios and the single reverse ratio, the following overview is provided.

If the manual valve is shifted to the overdrive position, pump pressure will be distributed to passage 148. Pump pressure also is supplied to passage 150, which pressurizes passage 370. This supplies pump pressure to the forward clutch control 372.

The 2–3 shift valve is shifted to the left under the influence of its valve spring 492. Line pressure from pressurized passage 148 then is distributed through the 2–3 shift valve between the lands 490 and 496 to passage 504. Line pressure then passes through check valve 438 as passage 408, which communicates with passage 504, becomes pressurized.

Check valve 394 connects passage 396 with passage 384, thus causing the forward clutch control valve 372 to be shuttled to the right. Pump pressure in passage 370, which communicates with passage 150, then communicates with passage 380. This supplies the forward clutch through the 3–4 shift valve, which is in the left-hand position at this time.

Passage 396 feeds orifice 312, the downstream side of which communicates with the neutral-to-drive accumulator and passage 398 which feeds the engagement valve 362. Line pressure passes through the engagement valve to the apply side of the low-and-intermediate brake servo 52. With the low-and-intermediate brake servo and the forward clutch thus applied, the transmission is condition for operation in the first ratio.

A shift from the first ratio to the second ratio occurs as line pressure is distributed from passage 524 and through the 1–2 shift valve, which is in the left-hand position as explained previously. Line pressure then passes from the passage 524 through the 1–2 shift valve to passage 526, which triggers the intermediate clutch shuttle valve, pushing it to the right. This allows line pressure to be transferred from passage 548 to passage 544. The 1–2 capacity modulator valve communicates with passage 544 through passage 238. Line pressure passes through valve 236 and pressurizes passage 246, thus engaging the intermediate clutch CL2. The servo B2 remains applied as previously explained with reference to operation in the first ratio.

A ratio change from the second ratio to the third ratio when the manual valve is in the OD position occurs as the 2–3 shift valve is shifted in a right-hand direction as explained previously. Line pressure then is delivered from passage 494 to passage 500. The 1–2 shift valve is shifted in a right-hand direction, as explained previously. This causes pressurized passage 500 to deliver pressurized fluid to passage 440, which is connected through the check valve 438 to passage 582. That passage is in communication with the direct drive clutch CL3 through check valve 534. Direct clutch pressure is distributed also to line 432 and through check valve 584 to the release side of the low-and-intermediate brake servo B2. With the direct clutch applied and the low-and-intermediate servo released, and with the intermediate clutch remaining applied, the transmission is conditioned for direct-drive operation.

If it is desired to have coast braking in direct drive ratio, the manual lever may be shifted to the D position, thereby pressurizing passage 596. Line pressure is then delivered from line 596 to line 588, as shown in FIG. 4D. This pressure then passes through the forward clutch control valve to passage 380 which supplies the forward clutch feed passage 390. With all three clutches applied, the transmission is conditioned for coast braking with the transmission in the direct-drive condition.

Orifice 592 is provided in passage 588 in order to control manual 4–3 downshifts as the manual valve is moved from the OD position to the D position. When fluid is delivered in the opposite direction, one-way check valve 594 bypasses the orifice 592.

When a shift to the fourth ratio from the third ratio is desired, the 2–3 shift valve remains in the right-hand position, and the 3–4 shift valve is shifted in a right-hand direction. Thus, line pressure is transferred from passage 494 to passage 532 and then to the 3–4 shift valve. The 3–4 shift valve is shifted in a right-hand direction as explained previously during operation in the fourth ratio. Thus, line pressure is transferred from passage 532 to passage 290. It then passes through the check valve 438 to direct clutch feed passage 582. Fluid is transferred also to passage 432 by the check valve 534 and through check valve 584 to the release side of the low-and-intermediate servo B2.

Pressurized passage 290 communicates with the overdrive servo B1 through orifice 292 and to the pressure side of the 3–4 accumulator. With both the direct clutch applied and the overdrive servo applied, the transmission is conditioned for overdrive operation.

Reverse drive is obtained by moving the manual valve to the reverse position, which causes line pressure to be distributed to passage 560 to the check valve 394 and then to passage 384. This causes the forward clutch control valve to be shifted to the right. This results in a direct connection between pump pressure passage 370 and passage 380 which feeds the forward clutch CL1 through the 3–4 shift valve and the feed passage 390. The reverse clutch CL4 is applied because of the direct connection between passage 560 and the reverse clutch feed orifice 600.

On a neutral to manual low engagement, the manual valve is moved to the "1" position as in the case of a pull-in shift. Line pressure in passage 562 then is passed directly to the 2–3 servo regulator valve 406 in FIG. 4D. At that time, the 2–3 servo regulator valve spool is in a left position because of line pressure in line 504. Line pressure in passage 408 is not developed instantaneously upon movement of the manual valve because of the time lag due to the stroking of the servo piston. Thus, servo B becomes applied with a cushion action as apply pressure builds up in the low-and-intermediate servo gradually. Solenoid 3 is turned off in park and neutral, leaving forward clutch LC1 applied. Thus, it is necessary to apply the low-and-intermediate brake B2 with this softened engagement to effect a low gear engagement from neutral or park. Forward clutch CL1 is pressurized as explained previously with respect to the low ratio operation with the manual valve in the OD position.

During operation in reverse, reverse line pressure is delivered to the reverse boost valve element for the main regulator as explained previously. If there is a failure in the variable force solenoid, the pressure fail-safe valve 315 will move to the right under the influence of spring 322, thereby connecting booster passage 326 with converter regulator pressure passage 324. Regulated converter pressure then is substituted for throttle valve pressure on the boost valve element 196 of the main regulator valve, thereby preserving line pressure.

Figures 5, 6:
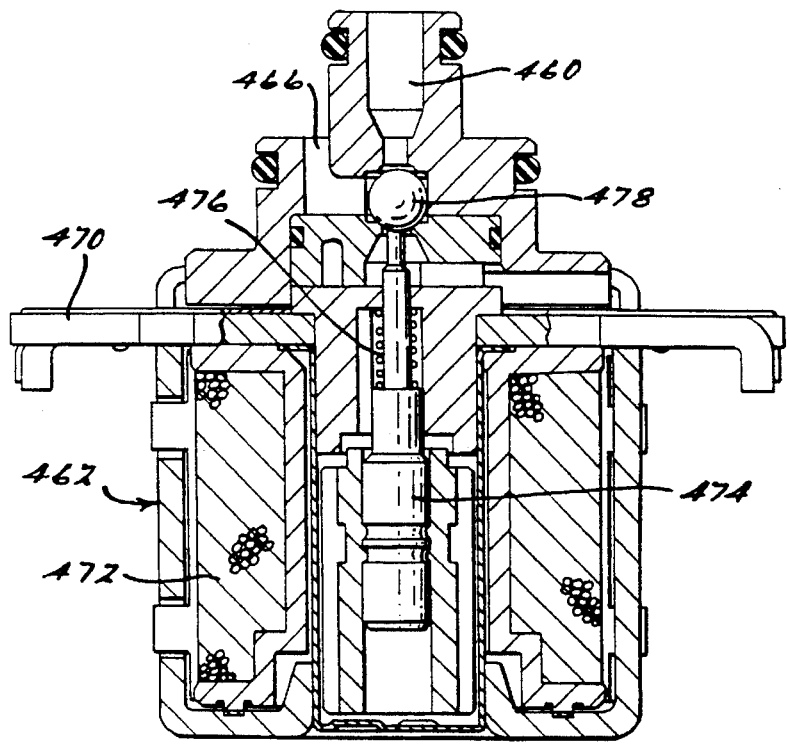
FIG. 5 is a cross-sectional view in schematic form showing a typical shift solenoid for use in the control system of FIGS. 4A through 4D.
FIG. 6 is a chart showing the solenoid engagement and disengagement pattern for effecting ratio changes in the transmission system.
Figure 7:
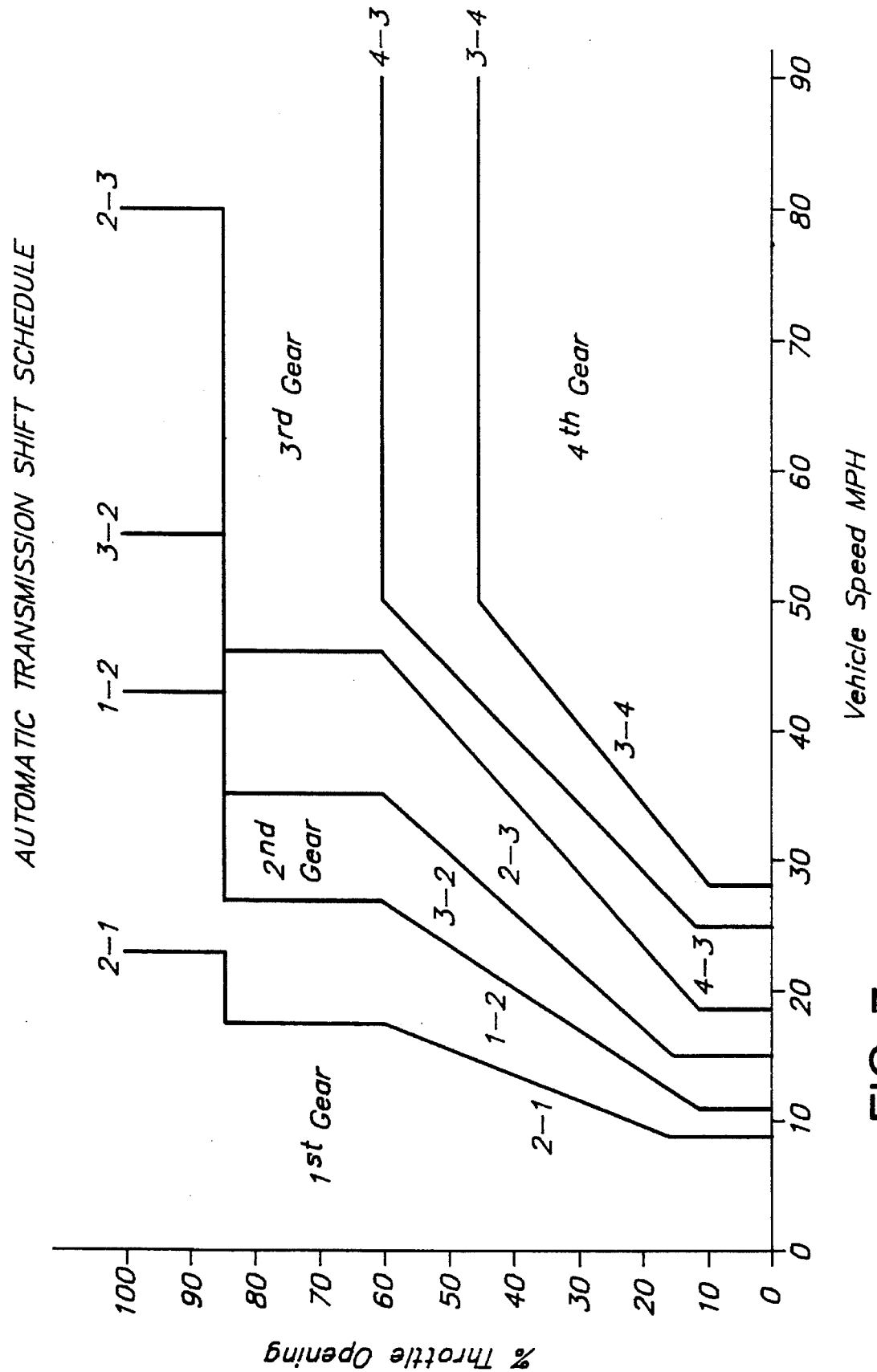
FIG. 7 is a plot of throttle position versus vehicle speed for each transmission gear ratio indicating the transmission shift schedule.

We have shown in FIG. 6 a chart that shows the conditions under which the three solenoids 462, 464 and 428 are energized. As explained previously, when one of these solenoids is energized, the valve is closed, thereby interrupting a signal to the signal passages 466, 468 or 427, respectively. The solenoid states for solenoid S3 is not relevant to PRNDL position "1", so the ON/OFF designation is not used. The same is true for solenoids S1 and S2 for the "R" position of PRNDL. The solenoid states will not affect the transmission operating mode for PRNDL positions "1" and "2".

Figure 3A:
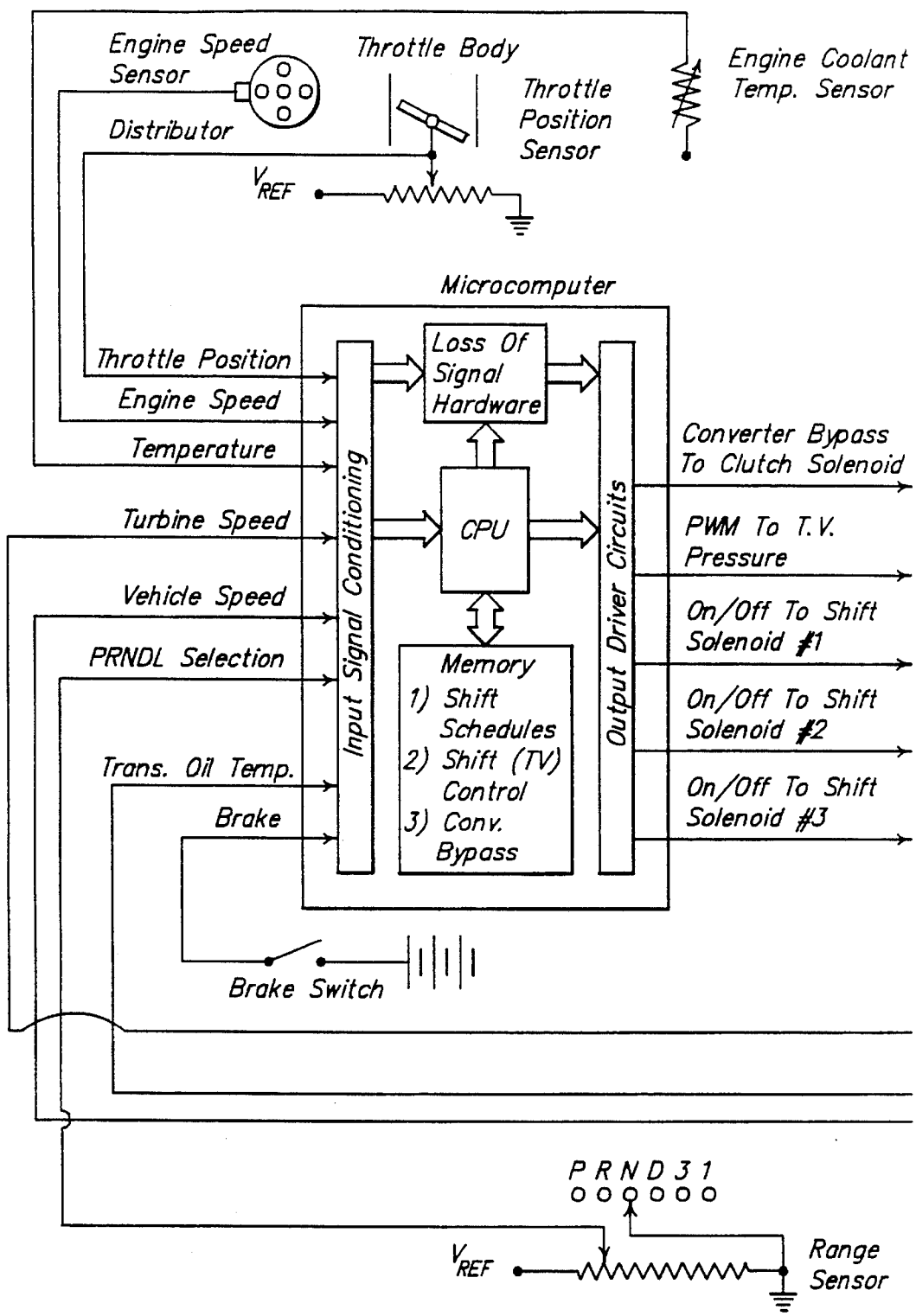
FIGS. 3A and 3B are schematic block diagrams of a microprocessor in a control system for an automatic transmission of the kind shown in FIG. 1.
Figure 3B:
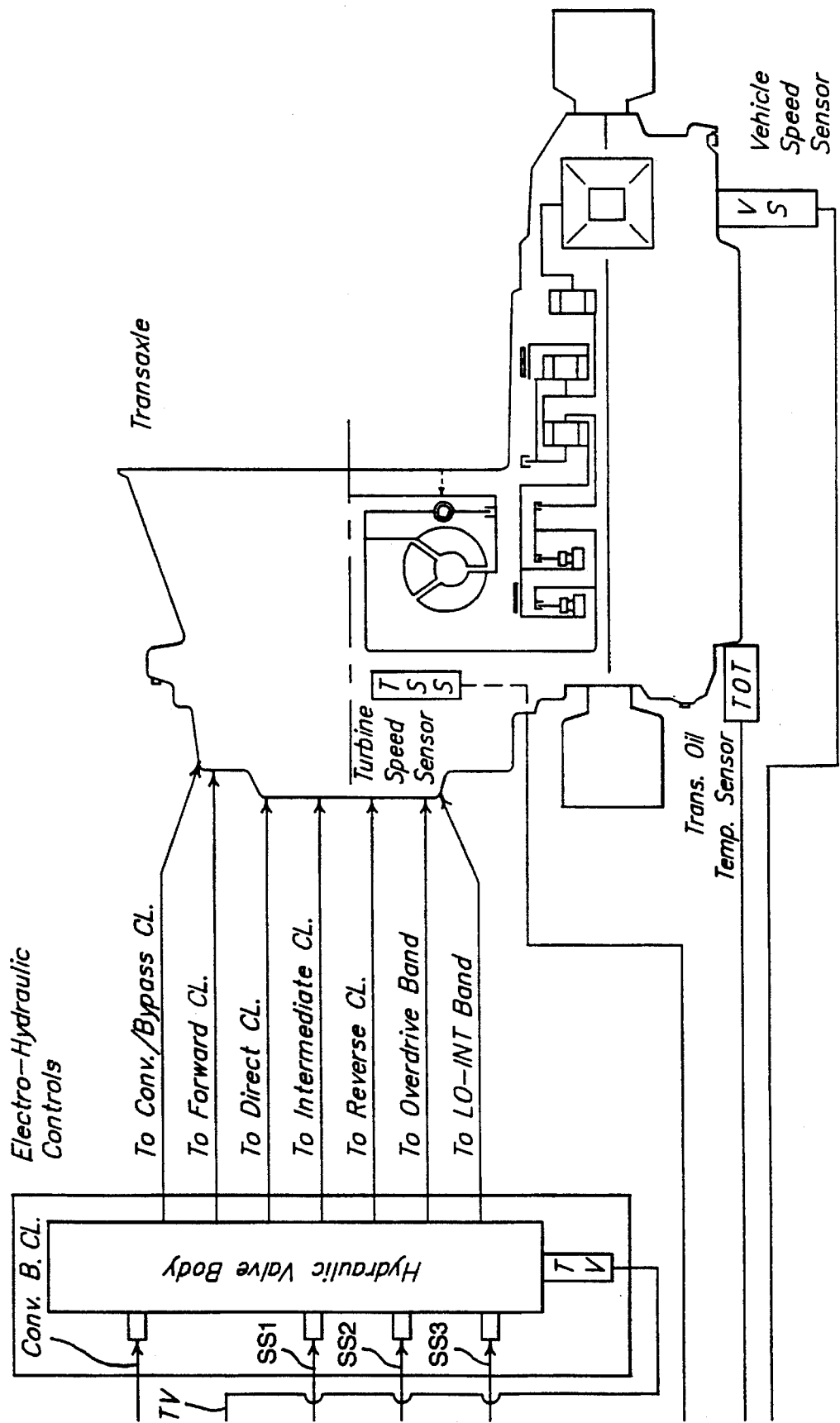

Microprocessor Of FIGS. 3A And 3B

FIGS. 3A and 3B show a schematic diagram of the microprocessor circuit and valve system. The various sensors provide signals for the microprocessor which are received by the input signal conditioning portion of the microprocessor. The shift schedules and the pressure control schedules are stored in the memory portion. The memory registers are addressed by the control processing portions after computations are made using the input signals as variables. The output driver circuit receives the result of the computations and develops output signals for the electro-hydraulic controls, as seen in FIG. 3B, including the three solenoid valves, the VFS TV solenoid and the bypass clutch solenoid.

The microprocessor includes appropriate gates and driver circuits for delivering the output of the operation of the shift strategy to a hydraulic control valve body for the transmission. The processor includes a central processor unit that has a memory for storing program shift strategy and a control unit that includes a read/write memory or RAM and internal busses in the memory and the CPU. The shift strategy programs are obtained from memory and provide appropriate control signals to the hydraulic valve circuit as the input signal conditioning portions of the processor read the input data, and the computation logic portions of the CPU deliver the results of the computation to the output driver circuit. The result of the computations of the CPU that are carried out on the input data is stored in RAM where it can be addressed, fetched, erased, rewritten or changed depending upon the operating conditions of the vehicle.

The CPU comprises an integrated circuit distinct from the microprocessor chip that comprises the memory portions. The memory and the CPU are connected by internal bus and interface circuitry. The data is read from memory as the processor seeks an instruction and then is transferred to the instruction decoder. When the instruction is to be carried out, the data that is fetched is transferred to an arithmetic logic unit. Then, pursuant to instructions in the decoder, other data is fetched from memory such as shift time, shift delay, etc., until the data fetched is addressed and can be stored in an accumulator. The data in the accumulator may be transferred to the data register and then fit back into the memory and stored in the next memory location of RAM where it may be addressed during the next background loop. The data that is stored in memory may be a shift schedule, for example, or functions in which two variables such as throttle position and vehicle speed are related, one to the other. In accordance with the shift function, the data also may be a table containing three variables or data such as a timer value and values for two other data items for variables such as vehicle speed and engine throttle position.

The shift control strategy is divided into separate routines or control modules which are executed sequentially during each background pass. Sub-modules for the main modules may be executed in sequential fashion as sub-modules are called out by the main modules. The various data registers are initialized as input data from the previously mentioned sensors or transferred to the input signal conditioning portion of the microprocessor. The control functions are carried out using the information that results from the inputting of the sensor data together with the information stored in memory and learned from a previous background pass.

The main modules and the sub-modules are executed in sequence in each background loop as mentioned above. Each module or logic portion is independent of the others and performs a specific function. They are executed and they are separately addressed by the processor pointer or program counter.

Reference may be made to U.S. Pat. No. 5,150,297 for the purpose of obtaining a more complete understanding of the operation of the gear ratio shift control strategy for a transmission of the kind that is described in this specification.

Gear Ratio Validity Test

The microprocessor continuously monitors turbine speed and vehicle speed and receives speed signals from a turbine speed sensor and a vehicle speed sensor. It processes these signals to calculate transmission gear ratio (RT_TRANS_GRV) during each background loop of the microprocessor. In order to determine whether the transmission is functioning correctly, the gear ratio validity test compares a commanded gear ratio to the calculated gear ratio. If the two values for gear ratio are the same, the transmission at that instant is deemed to be functioning correctly.

In addition to detecting errors in gear ratio, the logic for the gear ratio validity test makes it possible to record which gears are the so-called "good" gears. That is, it records a match between a commanded gear and the actual gear. When the logic determines that a gear ratio error exists, it determines also what gear the transmission actually is in. That information is stored in a register called GRV_STATE. That register is used by the shift solenoid functional test, to be described subsequently, to determine which shift solenoid, if any, is most likely responsible for a gear ratio failure. If a gear ratio failure is detected and the indicated gear ratio does not match any of the four transmission gear ratios, a flag called INVAL_RATIO will be set. This flag will signal the microprocessor to disable the shift solenoid functional test strategy because the error in that case would be due to something other than a shift solenoid error. If the error is due to a shift solenoid error, any solenoid failure should cause the transmission gear ratio to match a valid ratio.

The gear ratio validity test compares the current calculated gear ratio (RT_TRANS_GRV) to an acceptable range of values for that gear. The amount of the tolerance permitted above and below the actual gear ratio is calibratable.

During the gear ratio validity test, the logic will determine if a calculated gear ratio is either in the acceptable range or out of the acceptable range for a calibratable amount of time (GRV_MON_TIM for "in-range" values and GRV_ERR_TIM for "out-of-range" values). In that case, an event counter is incremented for either a good event or a bad event. If the counter (GRnMON_CNT) increments for a good event, the bad event counter for the same gear is cleared. Conversely, if a bad event counter (GRnERR_CNT) is incremented to indicate a bad event, the good event counter is cleared. If either counter continues to increment up to a value that exceeds a calibratable threshold value, the routine will continue. Also, if the bad event counter increments above a calibratable threshold value, the malfunction logic will continue.

If a good event is indicated by the good event counter, a monitor flag for the current commanded gear is set and the bits of the GRV_STATE register are loaded with a digital number corresponding to that gear. If a bad event is indicated by the bad event counter, a malfunction flag for the current commanded gear is set.

There are two possible strategy routines that can be used, each of which functions when the transmission is under power. In the first case, the converter is locked with the transmission in the overdrive range. This is designated in a special register called PRW_ON_SW=1. It is possible to attempt to determine the actual gear during this power-on mode even if the operating mode is abnormal. The monitor flag for the current commanded gear is set, and either the GRV_STATE register is loaded with the actual gear information or the register INVAL_RATIO is set. On the other hand, if the register PRW_ON_SW=0, the converter must be unlocked to determine the power-on abnormal operating modes. If a fault is detected when PWR_ON_SW=0, the converter will be unconditionally unlocked until the actual gear is determined and the test then must be reentered after power-on is determined by monitoring the slip across the converter. Once the entry conditions are met and the error time is passed, the monitor flag for the current commanded gear is set. Again, either GRV_STATE register is loaded with the actual gear information or the register INVAL_RATIO, indicating an invalid ratio.

The output of the gear ratio validity test can be used in the normal control logic within the processor to prevent a failure from being commanded. This is done after a gear has failed and it has been determined to what gear, if any, the transmission has failed. This logic, of course, must relearn which gear has failed and the gear to which the transmission has failed after the transmission is shut down and then is again powered up.

During the execution of the strategy, a correct gear ratio must exist for a calibrated amount of time (GRV_MON_TIM) before it will be counted as a good event. After a calibratable number of goods events have accumulated, the monitor flag (GEARnMON) for that gear will be set.

Figure 21:
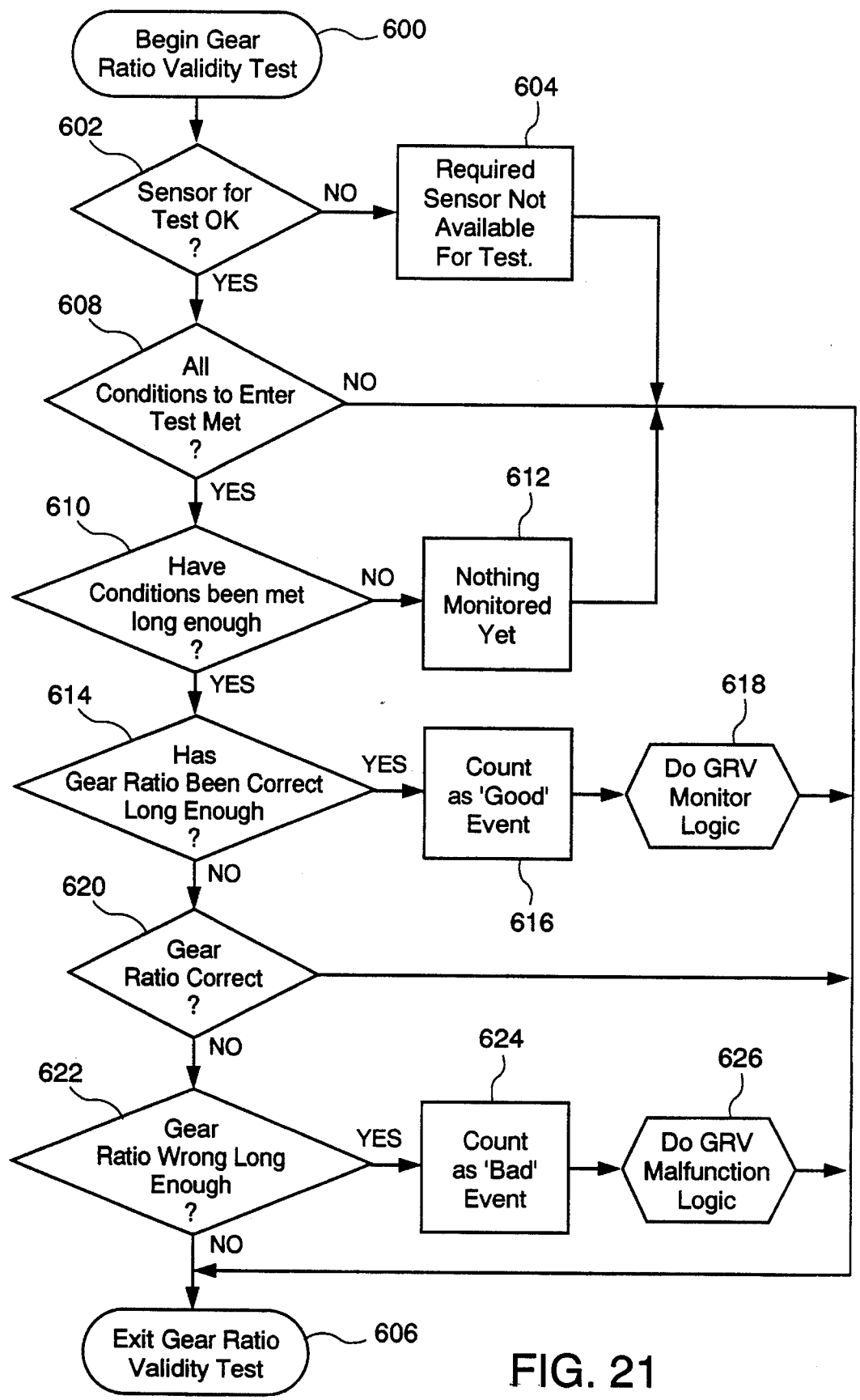
FIG. 21 is a flowchart showing the gear ratio validity logic for the diagnostic strategy.

In FIG. 21, we have shown a flow diagram showing the logic steps for the gear ratio validity strategy. The routine begins at 600 in FIG. 21. The program counter of the microprocessor then will address sequentially the registers that contain the instructions to cause the routine to proceed through the steps, the first of which is an inquiry at step 602 to determine whether all of the sensors are operative and are capable of developing a signal that can be used by the CPU. The sensors measure the temperature, vehicle speed, turbine speed and range selector position. This is done by checking failure mode flags that identify a failed sensor. If one or more of the sensors is not operative, the test cannot proceed since the sensor is not available for that test. This calls for a flag to be set at 604 which will cause the routine to proceed directly to the exit of the ratio validity test as shown at 606. If all of the sensors are OK, the routine will proceed to step 608. If it is determined at step 608 that all of the conditions necessary for continued execution of the logic have been met, the routine will continue.

Some of the entry conditions are a nonshifting state for the transmission, a power-on mode, a minimum throttle setting and a minimum vehicle speed. A power-on mode is present when there are no overrunning clutches that are freewheeling or when the wheels are driving the engine. If all of the entry conditions are not met, again the routine will exit the gear ratio validity test logic at 606. If all of the entry conditions are met, the routine will proceed to step 610, which begins a timer. The timer is calibrated so that a steady state can be determined. That is, the timer is set so that it can be determined whether the conditions have been met long enough to confirm that the vehicle is in the steady-state driving mode. If the timer indicates that the entry conditions have not been met long enough, a flag is set at 612 so that the routine will not proceed further. It will move again to the exit at 606. If the conditions have been met long enough, the routine will proceed to the next step at 614 where the calculated gear ratio conforms to an acceptable range for that gear and that the gear ratio has been correct long enough, as measured by a second timer.

The timers that are used in connection with step 610 and step 614 will prevent a transient condition from affecting the test. They permit continuation of the ratio validity logic steps only if the steady-state condition is present. If the gear ratio has been correct long enough, a counter at 616 is indexed, thereby recording a good event. The routine then will proceed to action block 618 where the gear ratio validity monitor logic takes place. That monitor logic will be described subsequently.

If the gear ratio has not been correct long enough, the routine then will proceed directly to the next step at 620 to determine whether the gear ratio is a correct ratio. This is done by calculating the gear ratio using turbine speed sensor information and vehicle speed sensor information and comparing the result of that computation with the actual transmission ratios. If correspondence exists between the computed gear ratio and the commanded gear ratio, the routine then will proceed to the exit at 606 since the ratio validity test then is completed. On the other hand, if the gear ratio is not correct, a test will be made at the next step 622 to determine whether the gear ratio is wrong long enough. This requires the setting of another timer. During several background loops of the microprocessor, a check will continuously be made as to whether the gear ratio still is wrong. If the timer runs down without a change in the indication of a wrong-gear ratio at 622, that event is counted as a bad event and a flag is set at 624. The routine then will be directed by the flag to do the malfunction logic, as indicated at action block 626. That malfunction logic Will be described subsequently.

After completion of the malfunction logic steps, the routine then exits at 606. The number of bad events determined at 624 is counted at action block 626, and if a threshold number of bad events is achieved without an intervening good event count, the malfunction logic will begin. Similarly, if the good event flag is set at 616 and the monitor logic is called for at step 618, the number of good events is counted. If the number of good events exceeds a threshold value without an intervening bad event, then the monitor logic will be executed.

Figure 23:
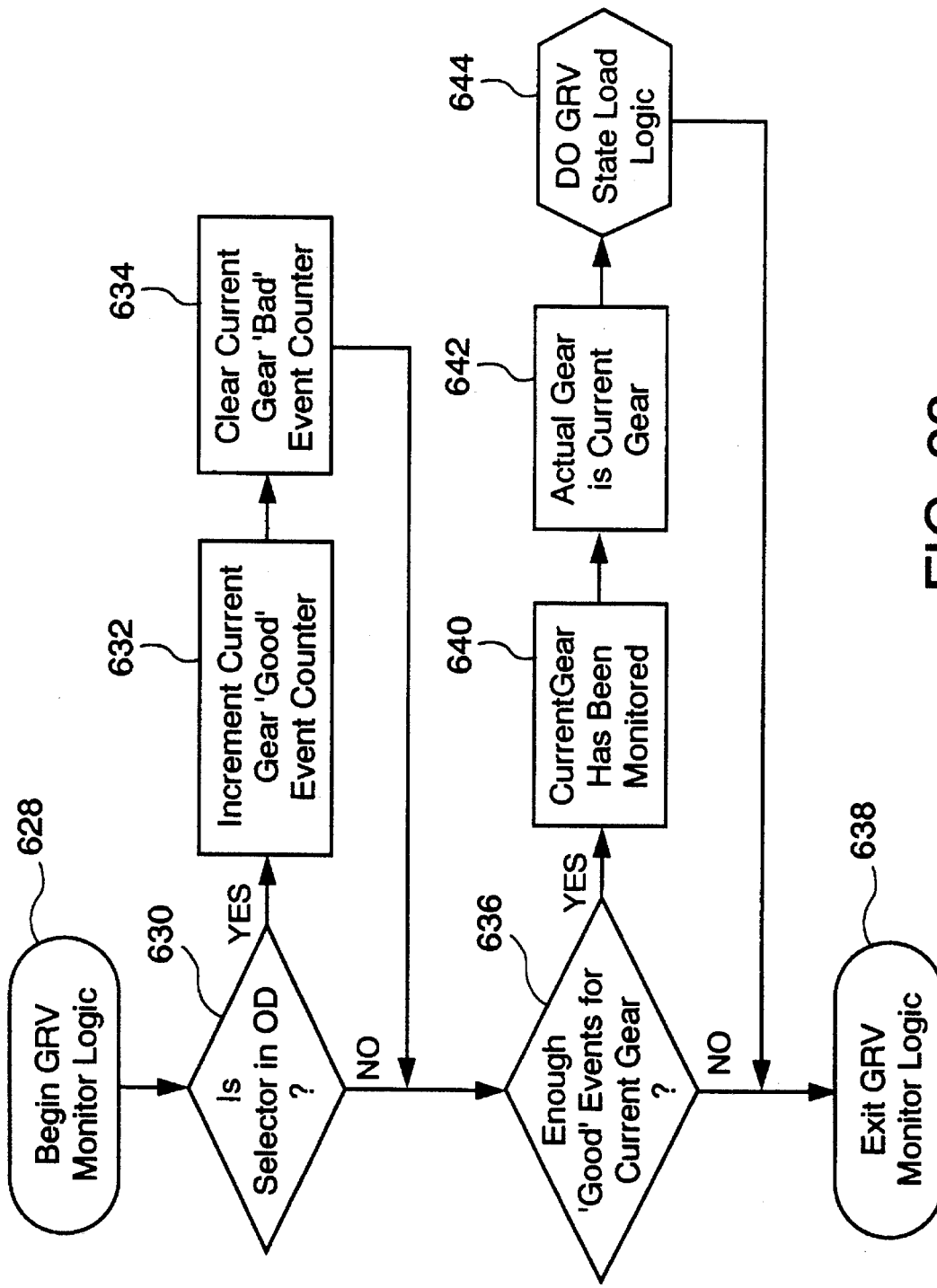
FIG. 23 is a flowchart showing the gear ratio validity monitor logic.

Referring next to FIG. 23, the monitor logic begins at stage 628. As the monitor logic moves to step 630, a test is made as to whether the selector lever of the transmission is in the overdrive range. If it is in the overdrive range, a flag is set at 632, indicating that a good event has been counted for the current gear. Also as explained previously, if a good event is counted and the counter is incremented, any preceding bad events that are counted are cleared at action block 634. The routine then will continue to the next step at 636. Of course, if the test at 630 is negative, the routine will have already passed to step 636 and then to the exit at 638.

At step 636, a counter determines whether there are enough good events for the current gear. That is a calibrated number stored in ROM. If enough good events have been counted for the current gear, a flag is set at 640, indicating that the current gear has been monitored. If the actual gear determined by the calculation using the turbine speed sensor input and the vehicle speed sensor input is the same as the current gear, the flag which is set at 642 will cause the routine to proceed to action block 644 where the state load logic takes place. That logic will be described subsequently. After that logic is completed, the monitor logic routine will exit as shown at 638.

Figure 24:
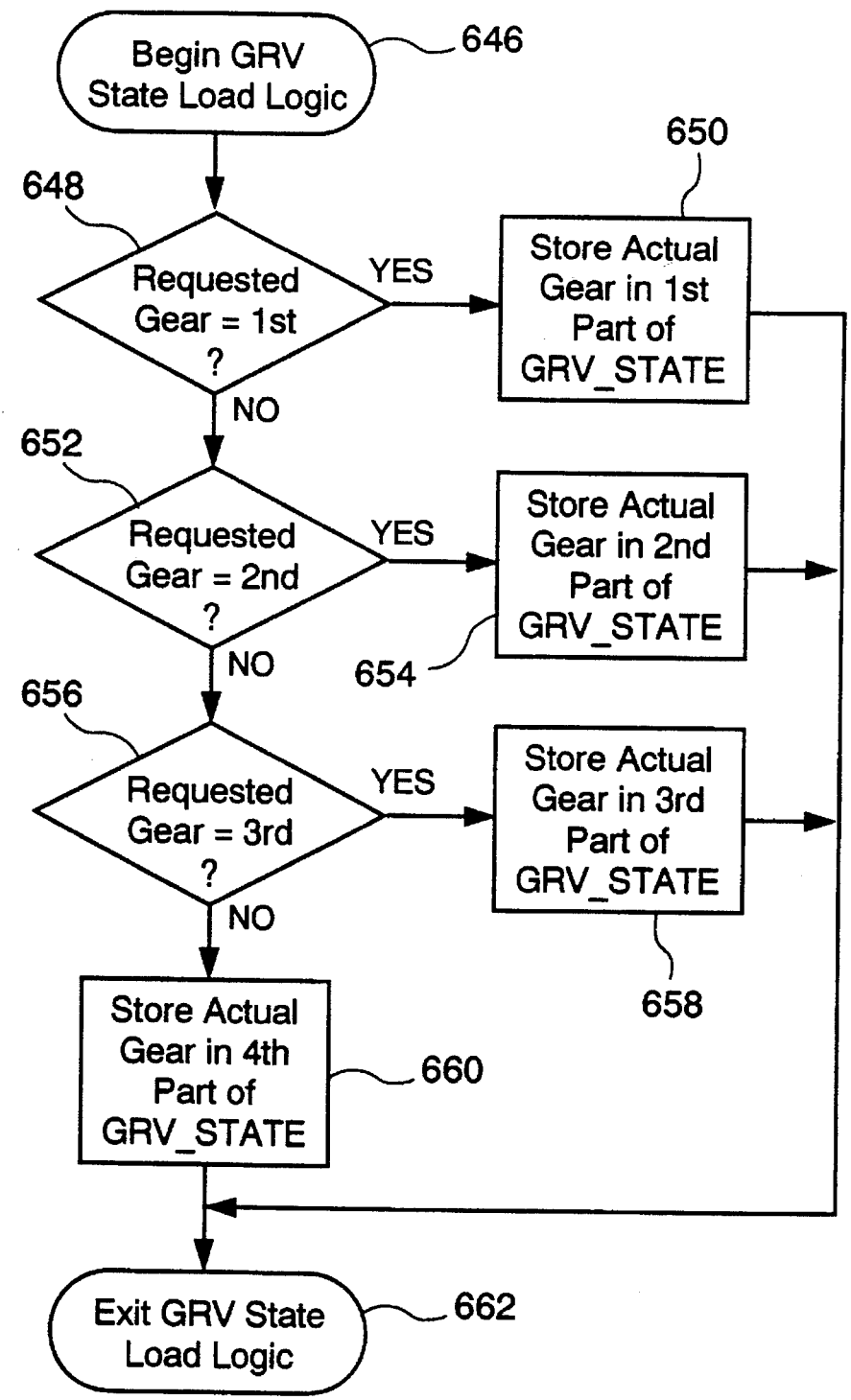
FIG. 24 is a flowchart showing the gear ratio validity state load logic.

Referring next to FIG. 24, we have shown in flow diagram form the gear ratio validity monitor logic steps, which begin at stage 646. It first is determined at step 648 whether the requested gear or the gear commanded by the microprocessor is first gear. If the commanded gear is first gear, the routine will store the actual gear digital number in a register in memory called GRV_STATE. That register is divided into four locations, and the digital number for first gear is stored in the first location of the register. This is indicated at action block 650. We will describe subsequently the architecture for the GRV_STATE register which records the digital information necessary for a determination of whether a particular solenoid has failed.

If the requested gear is not the first gear, a negative answer will be detected at step 648 and the routine will proceed to step 652 to determine whether the requested gear is second gear. If it is second gear, the digital number indicating second gear is stored in the GRV_STATE register at action block 654. On the other hand, if the requested gear is not first gear or second gear, an inquiry is made at step 656 as to whether the requested gear is third gear. If it is third gear, again that information in the form of a digital number is stored in still another location of the register called GRV_STATE, as indicated at action block 658. If the requested gear is not first, second or third, the requested gear must be fourth, in which case the actual gear, namely, fourth gear, is stored in the form of a digital number in a fourth location of the GRV_STATE register. This is indicated at action block 660. The GRV_STATE load logic then exits at 662.

Figure 25:
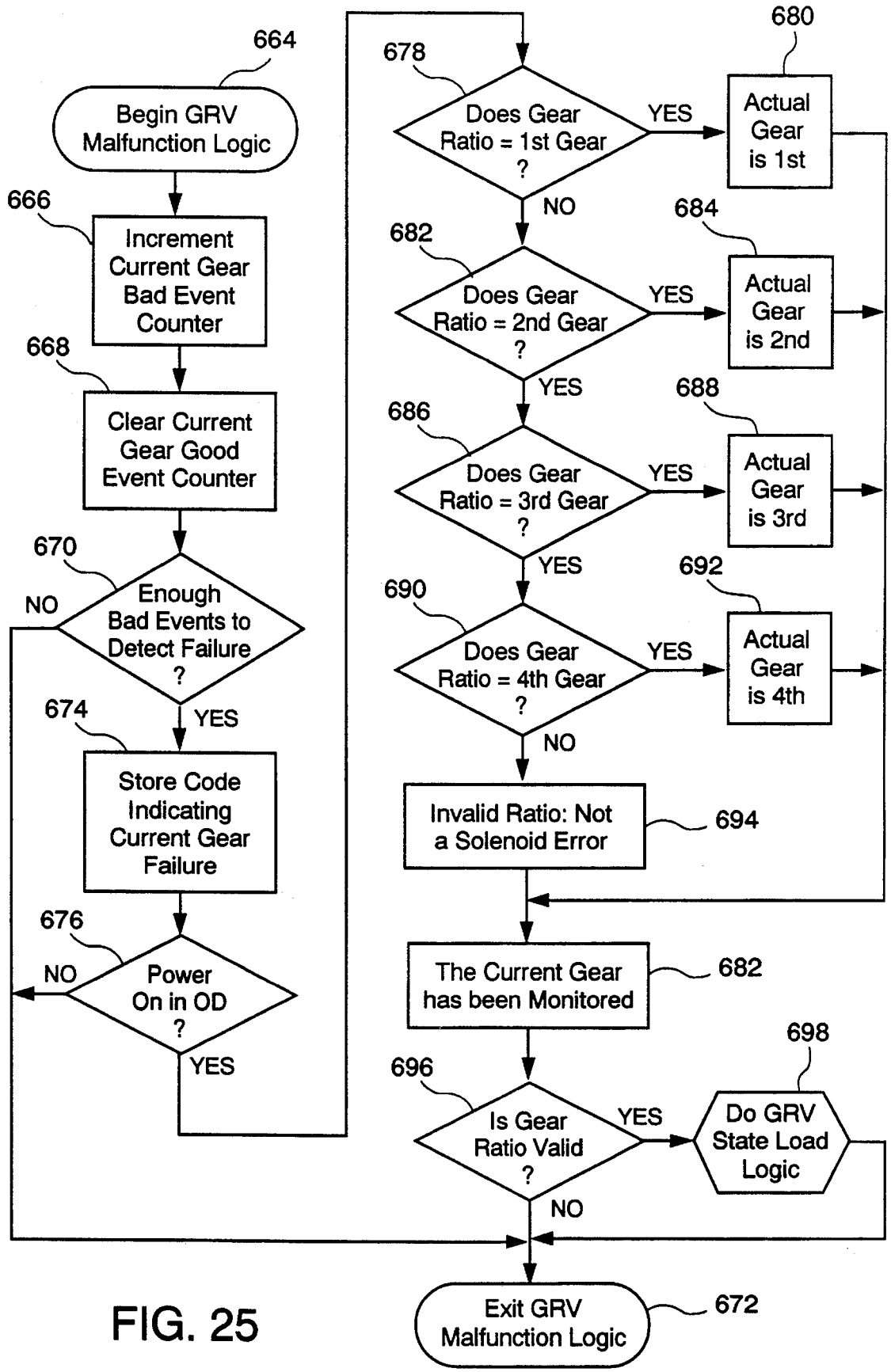
FIG. 25 is a flowchart showing the gear ratio validity malfunction logic portion of the diagnostic strategy.

At action block 626, as mentioned previously, a comparison is made of the number of bad events to a fault threshold. This is part of the malfunction logic. The malfunction logic flowchart is shown in FIG. 25. The routine begins at 664. After each bad event is indicated at action block 624, the malfunction logic will cause a bad event counter to be incremented, as shown at 666. At the same time, as shown at action block 668, any preceding good events that are counted by the good event counter will be cleared from that counter. The routine then tests at step 670 whether there are enough bad events to indicate a failure. That is, a comparison is made between the bad events that are accumulated by the bad event counter and the threshold number determined by the transmission calibrator. If there are not enough bad events to exceed the threshold number, the malfunction logic will exit at 672. If there are enough bad events to exceed the threshold number, a malfunction flag is set at 674 and the error code is stored, indicating a current gear failure. The routine then makes a check at step 676 as to whether the transmission is in a power-on mode in the overdrive range. The routine then will determine, as now will be described, which gear the transmission has failed into. That is, since the actual gear is not the commanded gear, the routine that follows will detect some gear other than the commanded gear.

If the transmission is in a power-on mode in the overdrive range, routine then will proceed to step 678 where a check is made as to whether the actual gear determined by the turbine speed sensor data and the vehicle speed data is first gear. If it is determined that the actual gear is indeed the first gear, as indicated in action block 680, the routine then will set a flag at action block 682, indicating that the current gear has been monitored. In a similar fashion, if the current gear is not first gear, a check is made at step 682 as to whether the current gear is the second gear. If it is second gear, and the actual gear also is second gear, as determined at action block 684, the routine then will proceed as before to action block 682 where a flag is set indicating that the second gear has been monitored. A negative response to the inquiry at 682 will cause the routine to test at step 686 whether the current gear is third gear. If it is third gear, it is compared to the actual gear computed at 688 using vehicle speed information and turbine speed information. If the two compare, the flag is set again at 682.

A negative response to the inquiry at 686 will call for a test at step 690 as to whether the gear ratio is fourth gear. If it is fourth gear and the actual gear as determined at action block 692 is fourth gear, the routine then will set a flag at 682, indicating that the fourth gear is monitored.

If the answers to the inquiries at steps 678–690 are all negative, that indicates that there is an invalid ratio. The conclusion from this is that the malfunction is not due to a solenoid error. This action is determined at block 694.

After the gears have been monitored, as indicated by, the flag at 682, a test is made at step 696 as to whether the gear ratio is valid. That is determined whether the gear ratio corresponds to a transmission ratio. If the two do correspond, the gear ratio validity state load logic is performed, as shown at action block 698. This is the logic that was described with reference to FIG. 24.

Shift Solenoid Functional Test

The shift solenoid functional test uses the results from the gear ratio validity test, described above, to determine the functional status of the shift solenoids. In the gear ratio validity test, as each gear is monitored, a flag (GEARn-MON) is set indicating that the monitoring for that gear is complete. As explained previously, the test also loads the register (GRV_STATE) with the actual transmission gear as computed using the vehicle speed information and the turbine speed information. Once all the gears have been monitored, as explained previously, and once all the flags have been set, the shift solenoid functional test logic decodes the information that previously was stored in the register GRV_STATE.

As explained previously, the register GRV_STATE is a register that contains the actual gear the transmission was in when each commanded gear was monitored. Whenever a gear is monitored, the gear the transmission is in is stored in a register location called GEAR_ACTUAL. This is shown in FIG. 8. The actual gear for first, for example, is indicated in the register location by the digital number 00. The corresponding digital number for second gear is 01. The digital number for third gear is 10. The digital number for fourth gear is 11.

This information is stored in the register GRV_STATE, which contains the status of each commanded gear after that gear has been monitored at least once.

In FIG. 9, we have shown in schematic form the structure of the register GRV_STATE that contains four bits, one bit corresponding to each of the four gears. The information that corresponds to the digital numbers stored in the bit locations is listed in the right-hand column of FIG. 9. The first bit location stores the actual gear when fourth gear was monitored. The second bit location stores the actual gear when third gear was monitored. The third bit location stores the actual gear when second gear was monitored, and the fourth bit location stores the actual gear when first gear was monitored. If all of the actual gears correspond to the commanded gears, no faults then would be indicated. The numbers that are stored in the bit locations for the register GRV_STATE then would be 11 10 01 00. When this digital number is converted to a decimal number, it is seen that it equals 228. Any other value in GRV-STATE after all the gears have been monitored would mean that a gear ratio failure has been detected.

If a gear ratio failure which does not match a valid gear is detected, a flag (INVAL_RATIO) is set, this indicates that the failure is due to something other than the shift solenoid and no shift solenoid failure codes will be set.

Figure 22A:
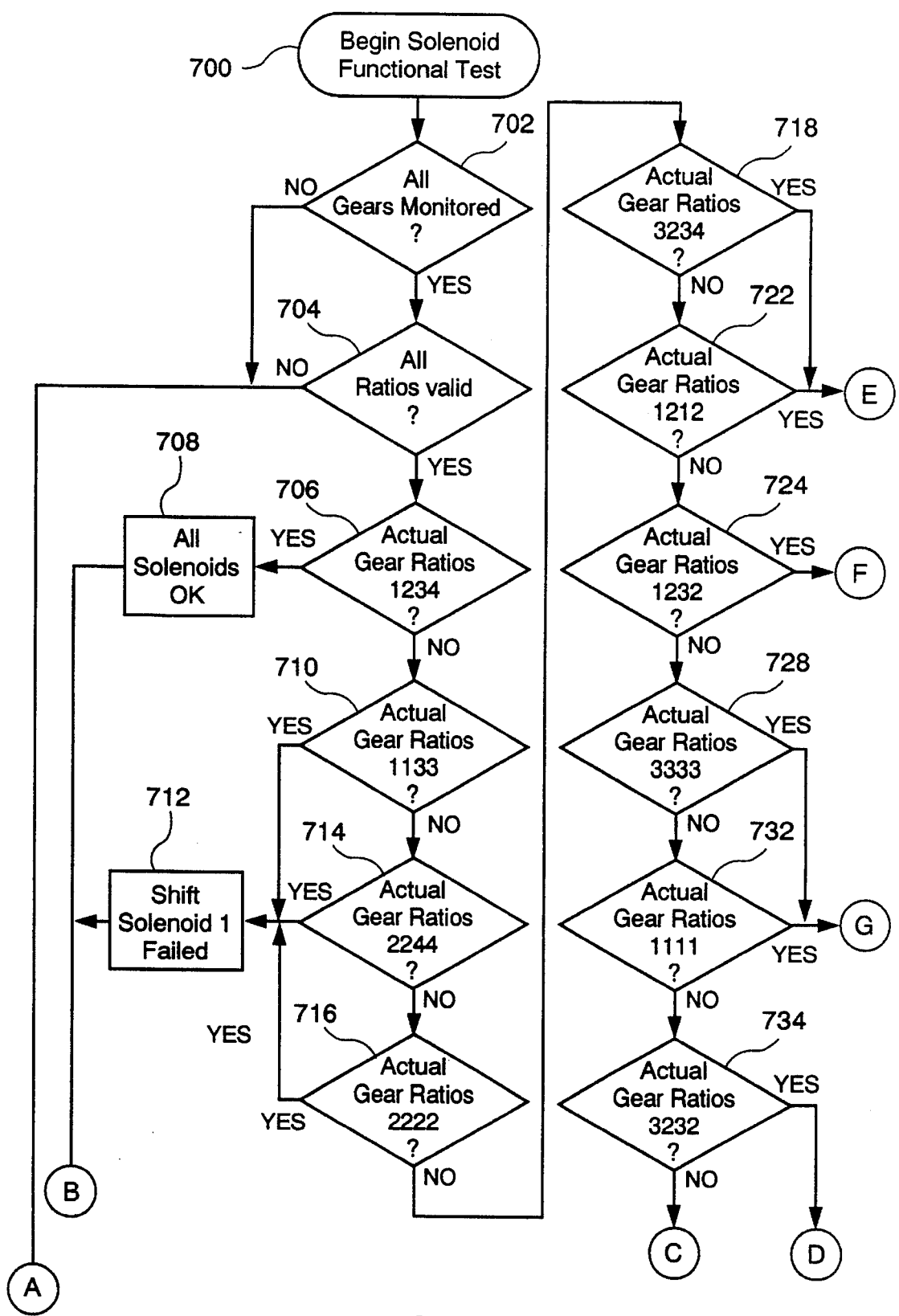
FIGS. 22A and 22B taken together, show the solenoid functional test logic for the diagnostic strategy.
Figure 22:
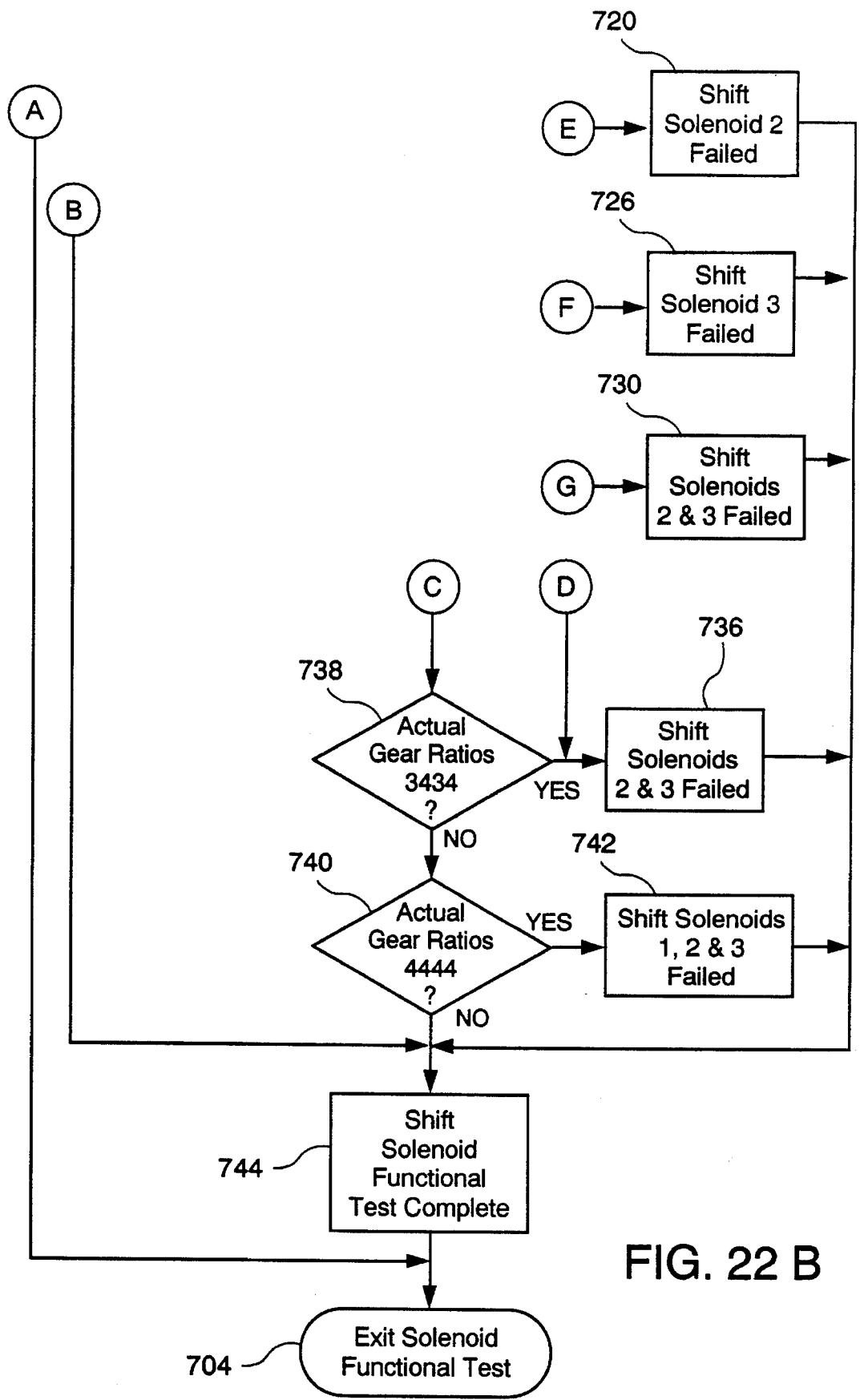

FIGS. 22A and 22B show the solenoid functional test logic in flow diagram form. The solenoid functional test begins at 700. The routine proceeds to the first step 702 where inquiry is made as to whether all of the gears have been monitored. If they have not all been monitored, the routine is interrupted immediately and the logic will exit at 704. If all of the gears indeed have been monitored, the routine will make an inquiry at 704 as to whether all of the gears are valid. That is, if the gears that are calculated do not correspond to the actual transmission gears, that would indicate that one or more of the ratios is not valid and again the routine will terminate at 704. If all the ratios are valid, a test is made at 706 as to whether gear ratio 1 was obtained when gear ratio 1 was tested, whether gear ratio 2 was obtained when gear ratio 2 was tested, whether gear ratio 3 was obtained when gear ratio 3 was tested, and whether gear ratio 4 was obtained when gear ratio 4 was tested. If the answer to the tests at 706 are all positive, that indicates that all of the solenoids are OK and an OK flag is set at action block 708. The functional test then is completed and the routine exits at 704.

On the other hand, if any one of the actual gear ratios does not conform to the tested ratios, the routine will proceed to action block 710. At that step, it is determined whether the actual gear ratio is first when first is tested, whether the gear ratio is first when the second ratio is tested, whether the gear ratio is third when the third ratio is tested, and whether the gear ratio was third when fourth ratio was tested. If that is the case, the routine would set a flag at 712 which would indicate a failure of shift solenoid 1. If the result of the test at 710 is negative, a test then is made at 714 as to whether second ratio was obtained when first ratio was commanded, whether second ratio was in place when the second ratio was commanded, whether fourth ratio was in place when third ratio was commanded, and whether fourth ratio was in place when fourth ratio was commanded. A positive response to that inquiry would also indicate a failure of shift solenoid 1. If the result of the test at 714 is negative, the routine will test at 716 as to whether the actual gear ratio was second when first was commanded, whether the actual gear ratio was second when second ratio was commanded, whether the actual ratio was second when third ratio was commanded, and whether the actual ratio was second when fourth ratio was commanded. A positive response to that inquiry also would indicate a failure of shift solenoid 1.

A negative response to the inquiry at 716 will result in a test at 718 as to whether the actual gear ratio was third when first ratio was commanded, whether the actual gear ratio was second when second gear was commanded, whether the actual gear ratio is third when third ratio is commanded, and whether the actual gear is fourth when fourth ratio is commanded. If the inquiry results in a positive response, that indicates that shift solenoid 2 has failed and a fault code is stored following the setting of a flag at action block 710.

If the result of the test at 718 is negative, the routine will test at step 722 as to whether the actual gear ratio is first when first ratio is commanded, whether the actual ratio is second when second ratio is commanded, whether the actual ratio is first when third gear is commanded, and whether the actual gear is second when fourth ratio is commanded. Again, a positive response to the test at 722 will result in the storing of a fault code for solenoid 2 at 720.

A negative response to the test at 722 will cause the routine to proceed to step 724 where it is determined whether the actual gear is first when first ratio is commanded, whether the actual ratio is second when second gear is commanded, whether actual ratio is third when third gear is commanded, and whether the actual gear is second when fourth ratio is commanded. A positive response to that test results in the storing of a fault code for shift solenoid 3 at action block 726.

A negative response to the test at 724 will initiate a test at 728 where it is determined whether the actual gear is third when the first gear is commanded, whether the actual gear is third when second gear is commanded, whether the actual gear is third when third gear is commanded, and whether the actual gear is third when fourth gear is commanded. If the response at 728 is positive, a fault code is stored at action block 730, indicating that shift solenoids 1 and 2 have failed. A negative response to the test at 728 will result in a test at 732 as to whether the actual gear is first when first gear is commanded, whether the actual gear is first when second gear is commanded, whether the actual gear is first when third gear is commanded, and whether the actual gear is first when fourth gear is commanded. If the result of that inquiry is positive, again the fault code is set at 730 since that indicates that solenoids 1 and 2 both are failed.

A negative response to the inquiry at 732 results in a test at 734 as to whether the actual gear ratio is third when first gear is commanded, whether the actual gear is second when second gear is commanded, whether the actual gear is third when third gear is commanded, and whether the actual gear is second when fourth gear is commanded. If the result of that inquiry is positive, a fault code is set at 736, indicating that solenoids 2 and 3 have failed. A negative response to the inquiry at 734 results in a test at 738 as to whether the actual gear is third when first gear is commanded, whether the actual gear is fourth when second gear is commanded, whether the actual gear is third when third gear is commanded, and whether the actual gear is fourth when fourth gear is commanded. A positive result of the inquiry at 738 again will indicate a failure of both solenoids 2 and 3 as shown at 736.

A negative response to the inquiry at 738 will cause the routine to proceed to step 740 where it is determined whether the actual gear is fourth ratio when first ratio was commanded, whether the actual ratio was fourth ratio when second ratio was commanded, whether the actual ratio was fourth ratio when third ratio was commanded, and whether the actual ratio was fourth ratio when fourth ratio was commanded. A positive result from the inquiry at 740 will indicate a fault code at 742 showing that all three solenoids have failed.

The routine then proceeds to action block 744 where a flag is set indicating that the shift solenoid functional test is complete, and the routine exits at 704. The information in FIG. 10, which corresponds to the solenoid state information of FIG. 6, is used in determining what solenoids, if any, are the cause of any detected gear ratio error, as indicated in FIG. 10. The normal actual gear representations are shown in FIG. 8. As seen in FIG. 8, the normal two-bit representation of first gear is 00, and the normal two-bit representation of second gear is 01. The normal two-bit representation of third gear is 10, and the normal two-bit representation of fourth gear is 11.

The symbol 0 is used in FIG. 10 to indicate when a solenoid is "off", and the symbol 1 is used to indicate when the solenoid is on. For example, in first gear, solenoid SS3 is "off", solenoid SS2 is "on", and solenoid SS1 is "off". A two-bit representation for the gear is indicated in the right-hand column of FIG. 10. If there are no faults, the register GRV_STATE contains the digital information 11 10 01 00. When that digital number is converted to a decimal, it equals 228, as indicated in FIG. 10.

FIG. 11 shows the states of the solenoids when SS1 is failed "off" and when solenoid SS1 is failed "on". As seen in the commanded gear column and the actual gear column, the numbers for the ratios do not correspond except for first gear and third gear. When the digital numbers corresponding to the actual gears are entered or loaded into the GRV_STATE register in the manner previously described, the GRV_STATE will contain the digital values 10 10 00 00. When that digital number is converted into a decimal, it equals 160 The corresponding values that are loaded into the GRV-STATE module for a condition where SS1 fails "on" also are shown in FIG. 11. In that case, the digital numbers that are loaded in the GRV_STATE register equal 245 when a conversion to a decimal is carried out.

FIG. 12 indicates the values that are loaded in the GRV_STATE module and the decimal conversions of the digital numbers located in the four locations of the register when solenoid SS2 fails "off" and when solenoid SS2 fails "on". In a similar fashion, the numbers stored in the GRV_STATE register when solenoid SS3 fails "off" and when solenoid SS3 fails "on" are indicated in FIG. 13. In the case where solenoid SS3 fails "off", the decimal conversion for the digital number stored in the GRV_STATE number is 100. In the case where solenoid SS3 fails "on", the corresponding decimal number is 228.

FIG. 14 shows a double failure involving both solenoids SS1 and SS2. In the left-hand portion of FIG. 14, the digital numbers stored in the GRV_STATE register indicate a failure in the "off" condition for both solenoids SS1 and SS2. The corresponding decimal number is 170. In the case where SS1 fails "off" and solenoid SS2 fails "on", the corresponding digital entries in the GRV_STATE register are indicated in the right-hand side of FIG. 14. The decimal number for that condition is 000.

FIG. 15 shows the information loaded in the GRV_STATE module when SS1 fails "on" and SS2 fails "off", as well as when SS1 fails on and SS2 fails "on". The respective decimal numbers for these conditions are 245 and 085.

FIG. 16 shows the entry data indicating that SS1 and SS3 have failed "off" and also indicating that SS1 has failed "off" and SS3 has failed "on". The digital information in the GRV_STATE register then converts to decimal 160 for both the "on" and "off" modes.

FIG. 17 shows corresponding information for the conditions in which SS1 has failed "on" and SS3 has failed "off", and when solenoid SS1 has failed "on" and solenoid SS3 has failed "on". The respective decimal numbers for these two conditions is 085 and 245.

FIG. 18 shows corresponding information for the conditions in which solenoid SS2 has failed "off" and solenoid SS3 has failed "off" as well as the condition in which the solenoid SS2 has failed "off" and solenoid SS3 has failed "on".

FIG. 19 shows the corresponding digital information for the condition in which solenoid SS2 has failed "on" and solenoid SS3 has failed "off" and the digital information for the condition in which solenoid SS2 has failed "on" and solenoid SS3 has failed "on".

FIG. 20 shows the solenoid states when a triple failure occurs. The information that is loaded in the GRV_STATE register is found in the right-hand column of FIG. 20. The on-off states for the three solenoids are indicated in the first three columns.

Having described a preferred embodiment of the invention, what we claim and desire to secure by U.S. Letters Patent is:

1. An electronic control system for an automatic transmission with multiple ratio gearing for an engine powered vehicle, said transmission having fluid pressure operated brakes and clutches establish establish and to disestablishing in sequence four forward-driving transmission gear ratios;

a shift valve circuit including a pump and three solenoid shift valve means for controlling pressure distribution to and from said brakes and clutches, each solenoid shift valve means having an "on" state and an "off" state;

said transmission including a hydrokinetic unit with an engine driven impeller and a turbine connected to said gearing through one of the clutches;

means for sensing engine and transmission operation variables including a turbine speed sensor means for developing a turbine speed signal and means for developing a vehicle speed signal;

means for monitoring gear ratio changes to determine whether commanded gear ratios correspond to actual gear ratios determined by said speed signals and for recording the results of the monitoring; and means for comparing said recorded results with a known pattern of state changes of said solenoid shift valve means whereby individual failures of said solenoid shift valve means are identified.

2. An electronic control system as set forth in claim 1 including an electronic microprocessor having a memory with a data register with four discrete bit locations, means for storing in each bit location data indicating an actual gear ratio determined by said monitoring means;

said microprocessor having registers containing digital data corresponding to the status of said solenoid shift valve means for each of several failure modes of said solenoid shift valve means; and means for comparing said actual gear ratio data with said digital data to identify each failed solenoid shift valve means.

3. A diagnostic test method for identifying solenoid shift valve failures in a control system for a vehicle transmission with multiple ratio gearing and brakes and clutches for effecting ratio changes in said gearing, said control system including multiple shift valve means for establishing and disestablishing four forward driving gear ratios, three solenoid shift valve elements with "on" states and "off" states operatively connected to said shift valve means, said transmission including a hydrokinetic unit with an impeller and with a turbine connected to said gearing through one of said clutches;

continuously monitoring turbine speed and vehicle speed and computing actual gear ratio using vehicle speed and turbine speed data;

monitoring commanded gear ratio changes and actual gear ratio changes during a first operating interval;

recording the actual gear ratio and the commanded gear ratio and comparing them to determine conformance or variance between them;

counting during a second operating interval the number of ratio changes in which said conformance exists and the number of ratio changes in which said variance exists; and comparing a known pattern of operating states for said solenoid shift valve elements with the operating states of said solenoid shift valve elements for each commanded gear ratio whereby failures of said solenoid shift valve elements are identified.

4. The method set forth in claim 3 including the steps of comparing a pattern of monitored operating states of said solenoid shift valve elements with a known pattern of operating states for said solenoid shift valve elements corresponding to transmission gear ratios whereby a control system failure not due to a solenoid shift valve element failure is distinguished from a control system failure due to a solenoid shift valve element failure.

5. The method set forth in claim 4 including the step of monitoring said commanded gear ratios and said actual gear ratios for a predetermined time before gear ratio data is recorded during said monitoring whereby steady state operating conditions are ensured.

6. The method set forth in claim 4 including the steps of monitoring entry conditions for diagnostic testing to prevent execution of said method when said transmission is not in a torque delivery mode and when said turbine speed and said vehicle speed are below threshold limits.

7. The method set forth in claim 3 including the step of monitoring said commanded gear ratios and said actual gear ratios for a predetermined time before gear ratio data is recorded during said monitoring whereby steady state operating conditions are ensured.

8. The method set forth in claim 3 including the steps of monitoring entry conditions for diagnostic testing to prevent execution of said method when said transmission is not in a torque delivery mode and when said turbine speed and said vehicle speed are below threshold limits.

* * * * *